(12) United States Patent
Yoshimine et al.

(10) Patent No.: US 9,240,601 B2
(45) Date of Patent: Jan. 19, 2016

(54) FUEL CELL MODULE

(71) Applicants: Yuki Yoshimine, Wako (JP); Tetsuya Ogawa, Wako (JP)

(72) Inventors: Yuki Yoshimine, Wako (JP); Tetsuya Ogawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 35 days.

(21) Appl. No.: 14/347,909

(22) PCT Filed: Dec. 19, 2012

(86) PCT No.: PCT/JP2012/083760
§ 371 (c)(1),
(2) Date: Mar. 27, 2014

(87) PCT Pub. No.: WO2013/114775
PCT Pub. Date: Aug. 8, 2013

(65) Prior Publication Data
US 2014/0287332 A1   Sep. 25, 2014

(30) Foreign Application Priority Data
Jan. 30, 2012  (JP) ................. 2012-017309

(51) Int. Cl.
| H01M 8/06 | (2006.01) |
| H01M 8/04 | (2006.01) |
| H01M 8/24 | (2006.01) |

(52) U.S. Cl.
CPC ...... *H01M 8/04291* (2013.01); *H01M 8/04022* (2013.01); *H01M 8/04074* (2013.01); *H01M 8/0625* (2013.01); *H01M 8/0631* (2013.01); *H01M 8/2425* (2013.01); *Y02E 60/50* (2013.01)

(58) Field of Classification Search
CPC ....... H01M 8/04; H01M 8/06; H01M 8/0625; H01M 8/04291; H01M 8/0631; H01M 8/2425; H01M 8/04022; H01M 8/04074; H01M 8/24; Y02E 60/50
See application file for complete search history.

(56) References Cited

U.S. PATENT DOCUMENTS

| 2001/0009732 A1 | 7/2001 | Schuler |
| 2003/0096147 A1 | 5/2003 | Badding et al. |

(Continued)

FOREIGN PATENT DOCUMENTS

| JP | 2000223144 A | * | 8/2000 |
| JP | 2001-236980 |   | 8/2001 |

(Continued)

OTHER PUBLICATIONS

JP 2000223144 A machine translation.*

(Continued)

*Primary Examiner* — Sarah A Slifka
*Assistant Examiner* — Brian Ohara
(74) *Attorney, Agent, or Firm* — Rankin, Hill & Clark LLP

(57) ABSTRACT

A fuel cell module includes a first area where an exhaust gas combustor and a start-up combustor are provided, an annular second area disposed around the first area where a heat exchanger is provided, an annular third area disposed around the second area where a reformer is provided, and an annular fourth area disposed around the third area where an evaporator is provided, and a condensed water collecting mechanism for collecting condensed water produced by condensation of water vapor in a combustion gas by allowing the condensed water to flow through the fourth area, then, the third area, then, the second area, and then, the first area.

10 Claims, 17 Drawing Sheets

(56) References Cited

U.S. PATENT DOCUMENTS

2009/0208800 A1* 8/2009 Ogawa .................. 429/26
2010/0021784 A1 1/2010 Fourmigue

FOREIGN PATENT DOCUMENTS

| JP | 2002-284506 | 10/2002 |
| JP | 2003-229151 | 8/2003 |
| JP | 2003-327405 | 11/2003 |
| JP | 2004-288434 | 10/2004 |
| JP | 2008-108691 | 5/2008 |
| JP | 2008-222530 | 9/2008 |
| JP | 2010-504607 | 2/2010 |

OTHER PUBLICATIONS

U.S. Office Action dated Jul. 8, 2015 from co-pending U.S. Appl. No. 14/347,919, 21 pages.

Japanese Office Action dated Jul. 7, 2015 corresponds to co-pending U.S. Appl. No. 14/347,919, with partial English translation, 5 pages.

Japanese Office Action dated Aug. 11, 2015, Application No. 2012-017304, partial English translation included.

This application is co-pending with U.S. Appl. No. 14/347,919, filed Mar. 27, 2014, U.S. Appl. No. 14/347,905, filed Mar. 27, 2014, and U.S. Appl. No. 14/347,925, filed Mar. 27, 2014.

* cited by examiner

FUEL CELL MODULE

TECHNICAL FIELD

The present invention relates to a fuel cell module including a fuel cell stack formed by stacking a plurality of fuel cells for generating electricity by electrochemical reactions between a fuel gas and an oxygen-containing gas.

BACKGROUND ART

Typically, a solid oxide fuel cell (SOFC) employs a solid electrolyte made of an ion-conductive oxide such as stabilized zirconia. The electrolyte is interposed between an anode and a cathode to form an electrolyte electrode assembly (hereinafter also referred to as an MEA). The electrolyte electrode assembly is interposed between separators. During use thereof, generally, a predetermined number of the electrolyte electrode assemblies and the separators are stacked together to form a fuel cell stack.

As a system including this type of fuel cell stack, for example, the fuel cell battery disclosed in Japanese Laid-Open Patent Publication No. 2001-236980 (hereinafter referred to as conventional technique 1) is known. As shown in FIG. 15, the fuel cell battery includes a fuel cell stack 1a, and a heat insulating sleeve 2a provided at one end of the fuel cell stack 1a. A reaction device 4a is provided in the heat insulating sleeve 2a. The reaction device 4a includes a heat exchanger 3a.

In the reaction device 4a, as a treatment for a liquid fuel, partial oxidation reforming, which does not use water, is performed. After the liquid fuel is evaporated by an exhaust gas, the liquid fuel passes through a feeding point 5a, which forms part of the heat exchanger 3a. The fuel contacts an oxygen carrier gas heated by the exhaust gas to induce partial oxidation reforming, and thereafter, the fuel is supplied to the fuel cell stack 1a.

Further, as shown in FIG. 16, the solid oxide fuel cell disclosed in Japanese Laid-Open Patent Publication No. 2010-504607 (PCT) (hereinafter referred to as conventional technique 2) has a heat exchanger 2b including a cell core 1b. The heat exchanger 2b heats air at the cathode utilizing waste heat.

Further, as shown in FIG. 17, the fuel cell system disclosed in Japanese Laid-Open Patent Publication No. 2004-288434 (hereinafter referred to as conventional technique 3) includes a first area 1c having a vertically extending columnar shape, and an annular second area 2c disposed around the first area 1c, an annular third area 3c disposed around the second area 2c, and an annular fourth area 4c disposed around the third area 3c.

A burner 5c is provided in the first area 1c, and a reforming pipe 6c is provided in the second area 2c. A water evaporator 7c is provided in the third area 3c, and a CO shift converter 8c is provided in the fourth area 4c.

SUMMARY OF INVENTION

In conventional technique 1, in the direction toward the outside of the reaction device 4a, since the temperature of the exhaust gas is decreased, the water vapor contained in the exhaust gas is cooled, and condensation of the water vapor tends to occur easily. Therefore, the condensed water is retained in the reaction device 4a, and degradation of the equipment occurs due to the condensed water undesirably.

Further, likewise, in conventional techniques 2 and 3, the treatment of the condensed water becomes difficult, and the condensed water tends to be retailed in the apparatus easily. Thus, degradation of the equipment occurs due to the condensed water undesirably.

The present invention has been made to solve the aforementioned problems of this type, and has the object of providing a fuel cell module having a simple and compact structure, in which improvement in the heat efficiency is achieved, thermally self-sustaining operation is facilitated, and condensed water can be collected reliably.

The present invention relates to a fuel cell module comprising a fuel cell stack formed by stacking fuel cells for generating electricity by electrochemical reactions between a fuel gas and an oxygen-containing gas, a reformer for reforming a mixed gas of water vapor and a raw fuel chiefly containing hydrocarbon to produce the fuel gas supplied to the fuel cell stack, an evaporator for evaporating water, and supplying the water vapor to the reformer, a heat exchanger for raising temperature of the oxygen-containing gas by heat exchange with combustion gas, and supplying the oxygen-containing gas to the fuel cell stack, an exhaust gas combustor for combusting the fuel gas discharged from the fuel cell stack as a fuel exhaust gas and the oxygen-containing gas discharged from the fuel cell stack as an oxygen-containing exhaust gas to thereby produce the combustion gas, and a start-up combustor for combusting the raw fuel and the oxygen-containing gas to thereby produce the combustion gas.

The fuel cell module further comprises a first area where the exhaust gas combustor and the start-up combustor are provided, an annular second area disposed around the first area where one of the reformer and the heat exchanger is provided, an annular third area disposed around the second area where another of the reformer and the heat exchanger is provided, an annular fourth area disposed around the third area where the evaporator is provided, and a condensed water collecting mechanism for collecting condensed water produced by condensation of water vapor in the combustion gas by allowing the condensed water to flow the fourth area, then, the third area, then, the second area, and then, the first area.

In the present invention, the annular second area is disposed at the center around the first area where the exhaust gas combustor and the start-up combustor are provided, the annular third area is disposed around the second area, and the annular fourth area is disposed around the third area. In such a structure, hot temperature equipment with a large heat demand can be provided on the inside, and low temperature equipment with a small heat demand can be provided on the outside. Accordingly, an improvement in heat efficiency is achieved, and a thermally self-sustaining operation is facilitated. Further, a simple and compact structure is achieved.

Further, since the condensed water collecting mechanism is provided, the condensed water produced by condensation of the water vapor in the combustion gas flows from the fourth area, then, third area, then, the second area, and then, the first area. That is, the condensed water flows from the low temperature side to the high temperature side. Thus, the change of the condensed water again into the vapor phase is facilitated, and the condensed water is not retained in the FC peripheral equipment. Accordingly, degradation in the durability of the FC peripheral equipment is suppressed as much as possible, and it becomes possible to utilize the collected condensed water to obtain water vapor for reforming.

DESCRIPTION OF EMBODIMENTS

Figure 1:
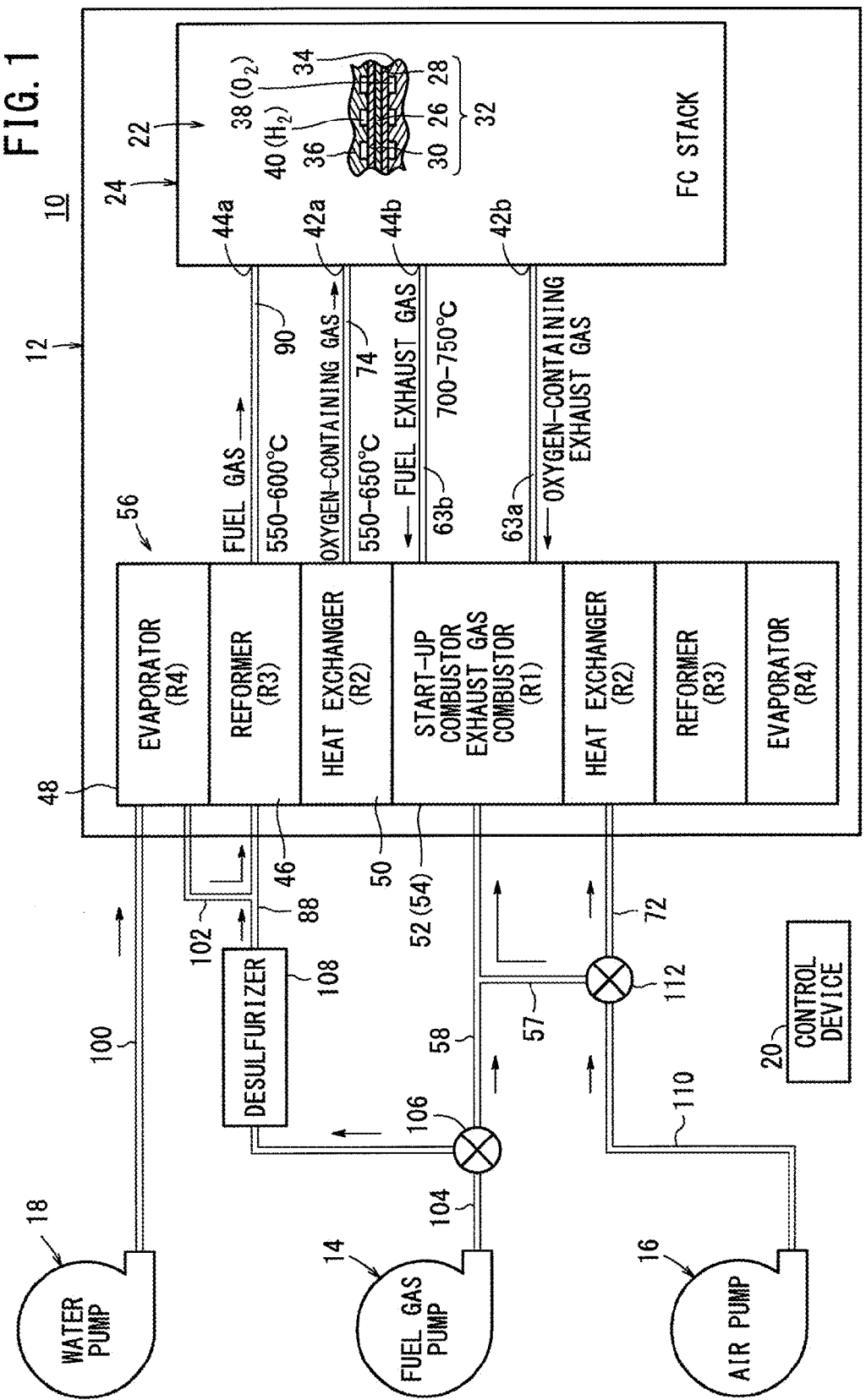
FIG. 1 is a diagram schematically showing the structure of a fuel cell system including a fuel cell module according to a first embodiment of the present invention.

As shown in FIG. 1, a fuel cell system 10 includes a fuel cell module 12 according to a first embodiment of the present invention. The fuel cell system 10 is used in various applications, including stationary and mobile applications. For example, the fuel cell system 10 may be mounted on a vehicle.

The fuel cell system 10 includes the fuel cell module (SOFC module) 12 for generating electrical energy used for power generation by electrochemical reactions between a fuel gas (a gas produced by mixing hydrogen gas, methane, and carbon monoxide) and an oxygen-containing gas (air), a raw fuel supply apparatus (including a fuel gas pump) 14 for supplying a raw fuel (e.g., city gas) to the fuel cell module 12, an oxygen-containing gas supply apparatus (including an air pump) 16 for supplying the oxygen-containing gas to the fuel cell module 12, a water supply apparatus (including a water pump) 18 for supplying water to the fuel cell module 12, and a control device 20 for controlling the amount of electrical energy generated in the fuel cell module 12.

The fuel cell module 12 includes a fuel cell stack 24 formed by stacking a plurality of solid oxide fuel cells 22 in a vertical direction (or a horizontal direction). The fuel cell 22 includes an electrolyte electrode assembly (MEA) 32. The electrolyte electrode assembly 32 includes a cathode 28, an anode 30, and an electrolyte 26 interposed between the cathode 28 and the anode 30. For example, the electrolyte 26 is made of an ion-conductive oxide such as stabilized zirconia.

A cathode side separator 34 and an anode side separator 36 are provided on both sides of the electrolyte electrode assembly 32. An oxygen-containing gas flow field 38 for supplying the oxygen-containing gas to the cathode 28 is formed in the cathode side separator 34, and a fuel gas flow field 40 for supplying the fuel gas to the anode 30 is formed in the anode side separator 36. Various types of conventional SOFCs can be adopted as the fuel cell 22.

The operating temperature of the fuel cell 22 is high, on the order of several hundred ° C. Methane in the fuel gas is reformed at the anode 30 to obtain hydrogen and CO, and hydrogen and CO are supplied to a portion of the electrolyte 26 adjacent to the anode 30.

An oxygen-containing gas supply passage 42a, an oxygen-containing gas discharge passage 42b, a fuel gas supply passage 44a, and a fuel gas discharge passage 44b extend through the fuel cell stack 24. The oxygen-containing gas supply passage 42a is connected to an inlet of each oxygen-containing gas flow field 38, the oxygen-containing gas discharge passage 42b is connected to an outlet of each oxygen-containing gas flow field 38, the fuel gas supply passage 44a is connected to an inlet of each fuel gas flow field 40, and the fuel gas discharge passage 44b is connected to an outlet of each fuel gas flow field 40.

The fuel cell module 12 includes a reformer 46 for reforming a mixed gas of water vapor and raw fuel which chiefly contains hydrocarbon (e.g., city gas) to thereby produce a fuel gas that is supplied to the fuel cell stack 24, an evaporator 48 for evaporating water and supplying water vapor to the reformer 46, a heat exchanger 50 for raising the temperature of the oxygen-containing gas through heat exchange with a combustion gas, and supplying the oxygen-containing gas to the fuel cell stack 24, an exhaust gas combustor 52 for combusting the fuel gas, which is discharged as a fuel exhaust gas from the fuel cell stack 24, and the oxygen-containing gas, which is discharged as an oxygen-containing exhaust gas from the fuel cell stack 24, to thereby produce the combustion gas, and a start-up combustor 54 for combusting the raw fuel and the oxygen-containing gas to thereby produce the combustion gas.

Basically, the fuel cell module 12 is made up of the fuel cell stack 24 and FC (fuel cell) peripheral equipment 56. FC peripheral equipment 56 includes the reformer 46, the evaporator 48, the heat exchanger 50, the exhaust gas combustor 52, and the start-up combustor 54.

Figure 2:
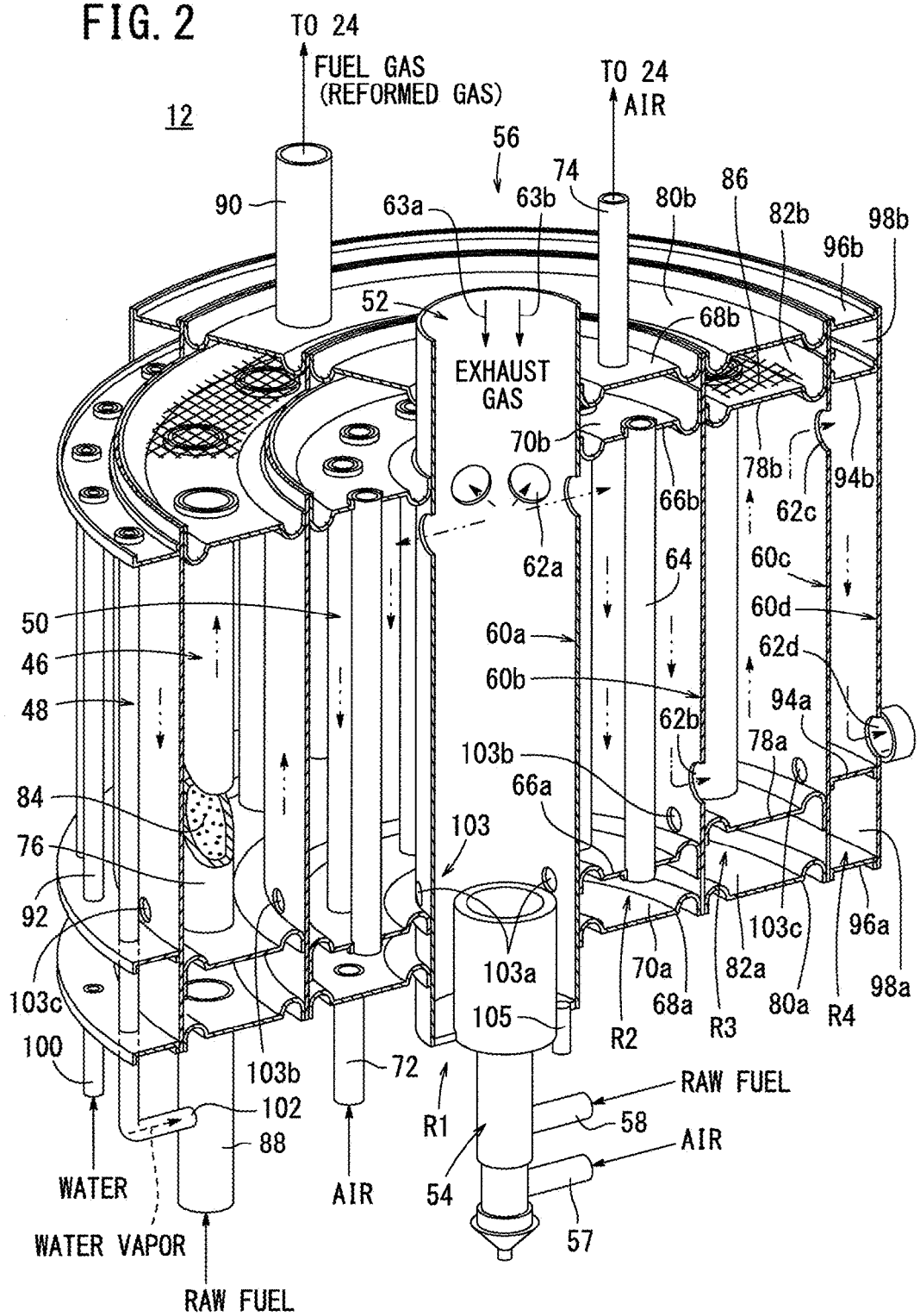
FIG. 2 is a perspective view with partial omission showing FC peripheral equipment of the fuel cell module.

As shown in FIG. 2, the FC peripheral equipment 56 includes a first area R1 comprising, e.g., a circular opening where the exhaust gas combustor 52 and the start-up combustor 54 are provided, an annular second area R2 formed around the first area R1 where the heat exchanger 50 is provided, an annular third area R3 formed around the second area R2 where the reformer 46 is provided, and an annular fourth area R4 formed around the third area R3 where the evaporator 48 is provided.

Figure 3:
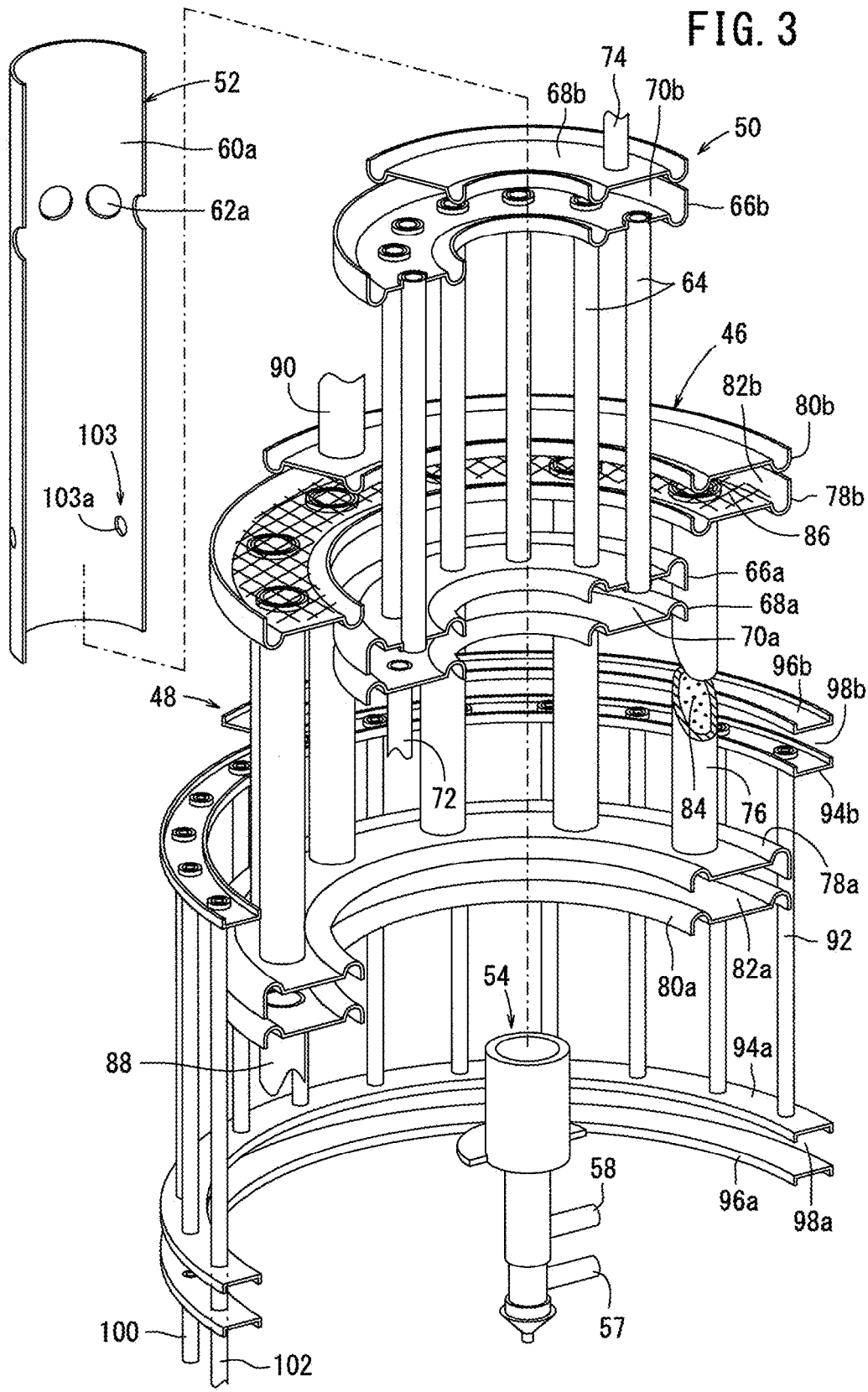
FIG. 3 is an exploded perspective view showing main components of the FC peripheral equipment.

As shown in FIGS. 2 and 3, the start-up combustor 54 includes an air supply pipe 57 and a raw fuel supply pipe 58. The start-up combustor 54 includes an ejector function for generating a negative pressure for sucking raw fuel in the raw fuel supply pipe 58 by flow of air supplied from the air supply pipe 57.

Figure 4:
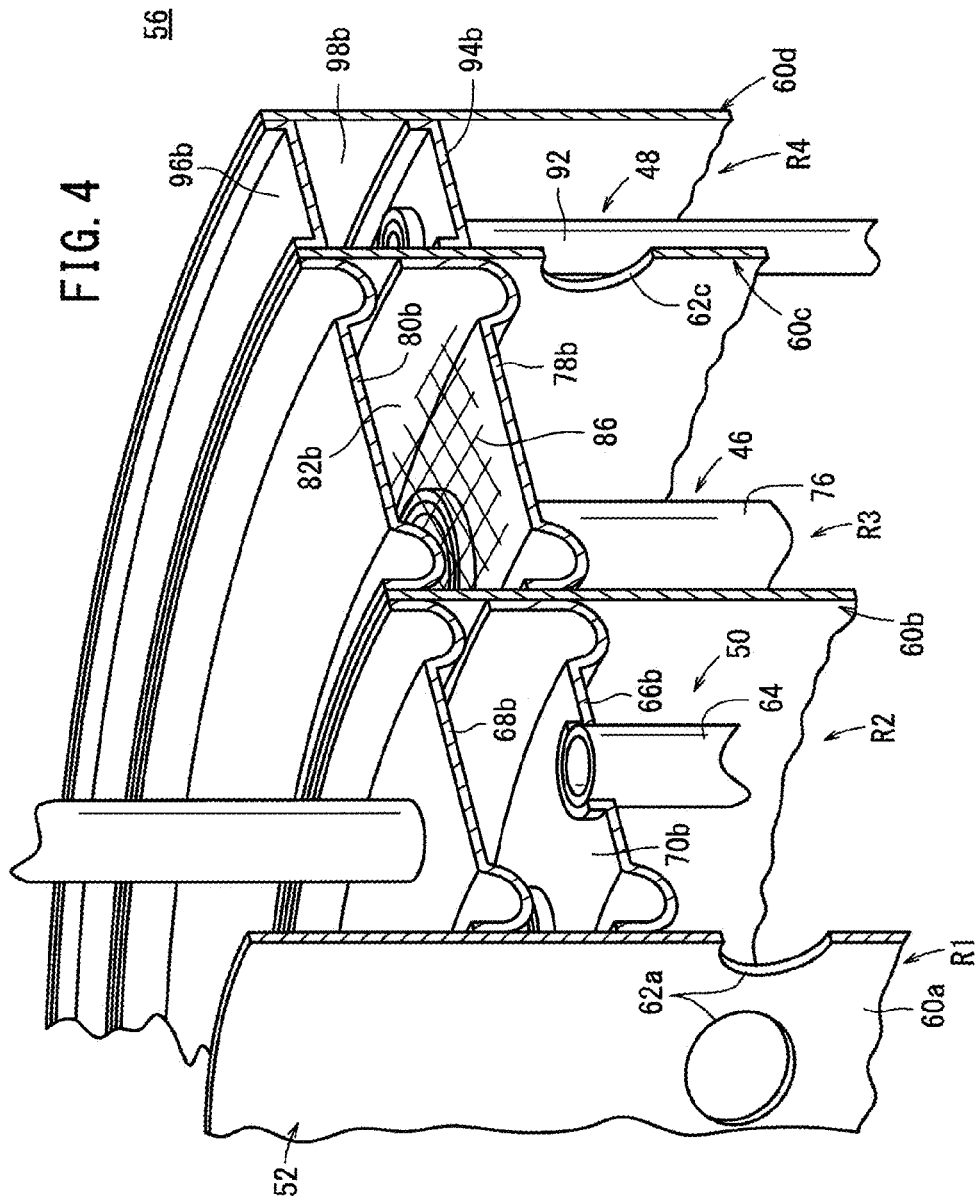
FIG. 4 is an enlarged perspective view showing main components of the FC peripheral equipment.

As shown in FIGS. 2 and 4, the FC peripheral equipment 56 includes a first partition plate 60a provided between the first area R1 and the second area R2, a second partition plate 60b provided between the second area R2 and the third area R3, and a third partition plate 60c provided between the third area R3 and the fourth area R4. Also, a fourth partition plate 60d is disposed around the fourth area R4 as an outer plate.

As shown in FIGS. 2 and 3, the exhaust gas combustor 52 is provided inside the first partition plate 60a that contains the start-up combustor 54. The first partition plate 60a has a cylindrical shape. A plurality of first combustion gas holes 62a are formed along an outer circumferential portion of the first partition plate 60a, adjacent to an end of the first partition plate 60a close to the fuel cell stack 24.

A plurality of second combustion gas holes 62b are formed adjacent to an end of the second partition plate 60b opposite from the fuel cell stack 24. A plurality of third combustion gas holes 62c are formed adjacent to an end of the third partition plate 60c close to the fuel cell stack 24. A plurality of fourth combustion gas holes 62d are formed adjacent to an end of the fourth partition plate 60d opposite from the fuel cell stack 24. The combustion gas is discharged to the exterior through the fourth combustion gas holes 62d.

One end of an oxygen-containing exhaust gas channel 63a and one end of an fuel exhaust gas channel 63b are provided respectively on the first partition plate 60a. Combustion gas is produced inside the first partition plate 60a by a combustion reaction between the fuel gas (more specifically, a fuel exhaust gas) and the oxygen-containing gas (more specifically, an oxygen-containing exhaust gas).

As shown in FIG. 1, the other end of the oxygen-containing exhaust gas channel 63a is connected to the oxygen-containing gas discharge passage 42b of the fuel cell stack 24, and the other end of the fuel exhaust gas channel 63b is connected to the fuel gas discharge passage 44b of the fuel cell stack 24.

As shown in FIGS. 2 and 3, the heat exchanger 50 includes a plurality of heat exchange pipes (heat transmission pipes) 64 disposed around the first partition plate 60a. The heat exchange pipes 64 are fixed to a first inner ring 66a at one end (i.e., the other end opposite from the fuel cell stack 24; hereinafter, in the same manner, the other end opposite from the fuel cell stack 24 is referred to as "one end"). The heat exchange pipes 64 are fixed to a first inner ring 66b at the other end (i.e., one end closer to the fuel cell stack 24; hereinafter, in the same manner, the one end closer to the fuel cell stack 24 is referred to as an "other end").

A first outer ring 68a is provided on the outside of the first inner ring 66a, and a first outer ring 68b is provided on the outside of the first inner ring 66b. The first inner rings 66a, 66b and the first outer rings 68a, 68b are fixed respectively to the outer circumferential surface of the first partition plate 60a, and to the inner circumferential surface of the second partition plate 60b.

An annular oxygen-containing gas supply chamber 70a is formed between the first inner ring 66a and the first outer ring 68a, and oxygen-containing gas is supplied to the oxygen-containing gas supply chamber 70a. An annular oxygen-containing gas discharge chamber 70b is formed between the first inner ring 66b and the first outer ring 68b, and heated oxygen-containing gas is discharged into the oxygen-containing gas discharge chamber 70b (see FIGS. 2 to 4). Opposite ends of each of the heat exchange pipes 64 open respectively into the oxygen-containing gas supply chamber 70a and the oxygen-containing gas discharge chamber 70b.

An oxygen-containing gas supply pipe 72 is connected to the oxygen-containing gas supply chamber 70a. One end of an oxygen-containing gas channel 74 is connected to the oxygen-containing gas discharge chamber 70b, whereas the other end of the oxygen-containing gas channel 74 is connected to the oxygen-containing gas supply passage 42a of the fuel cell stack 24 (see FIG. 1).

The reformer 46 is a preliminary reformer for reforming higher hydrocarbon ($C_{2+}$) such as ethane ($C_2H_6$), propane ($C_3H_8$), and butane ($C_4H_{10}$) in the city gas (raw fuel), to thereby produce by steam reforming a fuel gas chiefly containing methane ($CH_4$), hydrogen, and CO. The operating temperature of the reformer 46 is several hundred ° C.

As shown in FIGS. 2 and 3, the reformer 46 includes a plurality of reforming pipes (heat transmission pipes) 76 disposed around the heat exchanger 50. The reforming pipes 76 are fixed to a second inner ring 78a at one end thereof, and are fixed to a second inner ring 78b at the other end thereof.

A second outer ring 80a is provided outside of the second inner ring 78a, and a second outer ring 80b is provided outside of the second inner ring 78b. The second inner rings 78a, 78b and the second outer rings 80a, 80b are fixed respectively to the outer circumferential surface of the second partition plate 60b, and to the inner circumferential surface of the third partition plate 60c.

An annular mixed gas supply chamber 82a is formed between the second inner ring 78a and the second outer ring 80a. A mixed gas of raw fuel and water vapor is supplied to the mixed gas supply chamber 82a. An annular reformed gas discharge chamber 82b is formed between the second inner ring 78b and the second outer ring 80b. The produced fuel gas (reformed gas) is discharged to the reformed gas discharge chamber 82b.

Opposite ends of each of the reforming pipes 76 open respectively into the mixed gas supply chamber 82a and the reformed gas discharge chamber 82b. Reforming catalyst pellets 84 fill inside of each of the reforming pipes 76. Metal meshes 86 are disposed on opposite ends of the reforming pipes 76 for supporting and maintaining the catalyst pellets 84 inside the reforming pipes 76.

A raw fuel supply channel 88 is connected to the mixed gas supply chamber 82a, and a later-described evaporation return pipe 102 is connected to a middle position of the raw fuel supply channel 88. One end of a fuel gas channel 90 is connected to the reformed gas discharge chamber 82b, whereas the other end of the fuel gas channel 90 is connected to the fuel gas supply passage 44a of the fuel cell stack 24 (see FIG. 1).

The evaporator 48 includes evaporation pipes (heat transmission pipes) 92 disposed outside of and around the reformer 46. The evaporation pipes 92 are fixed to a third inner ring 94a at one end thereof, and are fixed to a third inner ring 94b at the other end thereof.

A third outer ring 96a is provided outside of the third inner ring 94a, and a third outer ring 96b is provided outside of the third inner ring 94b. The third inner rings 94a, 94b and the third outer rings 96a, 96b are fixed to the outer circumferential surface of the third partition plate 60c, and to the inner circumferential surface of the fourth partition plate 60d.

An annular water supply chamber 98a is formed between the third inner ring 94a and the third outer ring 96a. Water is supplied to the water supply chamber 98a. An annular water vapor discharge chamber 98b is formed between the third inner ring 94b and the third outer ring 96b. Water vapor is discharged to the water vapor discharge chamber 98b. Opposite ends of the evaporation pipes 92 open into the water supply chamber 98a and the water vapor discharge chamber 98b, respectively.

A water channel 100 is connected to the water supply chamber 98a. One end of the evaporation return pipe 102, which includes at least one evaporation pipe 92, is provided in the water vapor discharge chamber 98b, whereas the other end of the evaporation return pipe 102 is connected to a middle position of the raw fuel supply channel 88 (see FIG. 1). The raw fuel supply channel 88 has an ejector function for generating a negative pressure as a result of the raw fuel flowing therein, for thereby sucking the water vapor.

Figure 6:
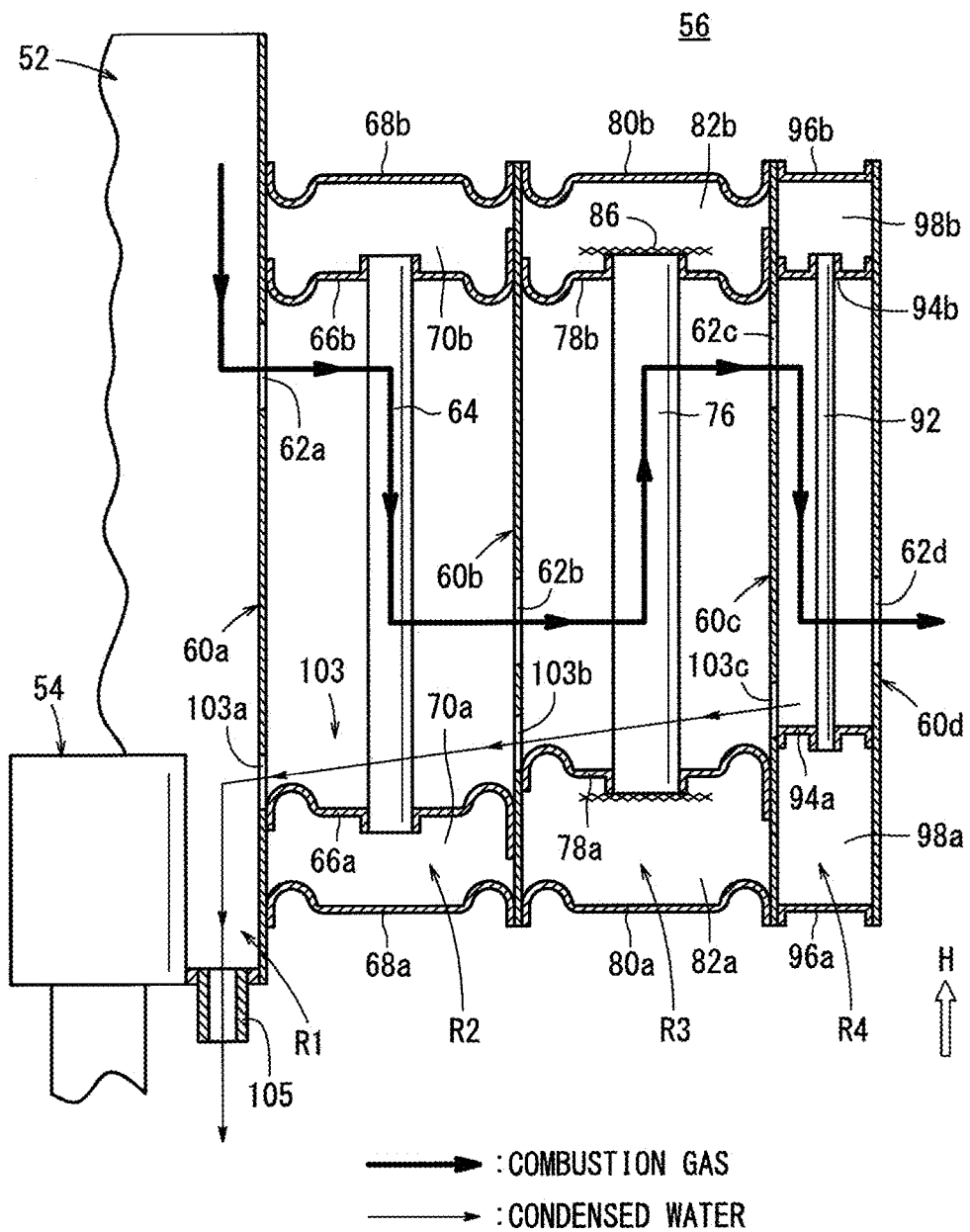
FIG. 6 is a view showing a condensed water collecting mechanism of the peripheral equipment.

As shown in FIGS. 2 and 6, the FC peripheral equipment 56 includes a condensed water collecting mechanism 103 for collecting the condensed water produced by condensation of the water vapor in the combustion gas by allowing the condensed water to flow through the fourth area R4, then, third area R3, then, second area R2, and then, the first area R1.

The condensed water collecting mechanism 103 includes an upper surface of the first inner ring 66a, an upper surface of the second inner ring 78a, an upper surface of the third inner ring 94a. The upper surface of the second inner ring 78a (the position of the bottom surface in the direction indicated by the arrow H in FIG. 6) is higher than the upper surface of the first inner ring 66a, and the upper surface of the third inner ring 94a is higher than the upper surface of the second inner ring 78a. The upper surface of the first inner ring 66a, the upper surface of the second inner ring 78a, and the upper surface of the third inner ring 94a may have the same height.

The condensed water collecting mechanism 103 includes first condensed water holes 103a formed on the lower side of the first partition plate 60a opposite to the upper side which is closer to the fuel cell stack 24, second condensed water holes 103b formed on the lower side of the second partition plate 60b, third condensed water holes 103c formed on the lower side of the third partition plate 60c. The positions of the second condensed water holes 103b are higher than the positions of the first condensed water holes 103a, and the positions of the third condensed water holes 103c are higher than the position of the second condensed water holes 103b.

Figure 7:
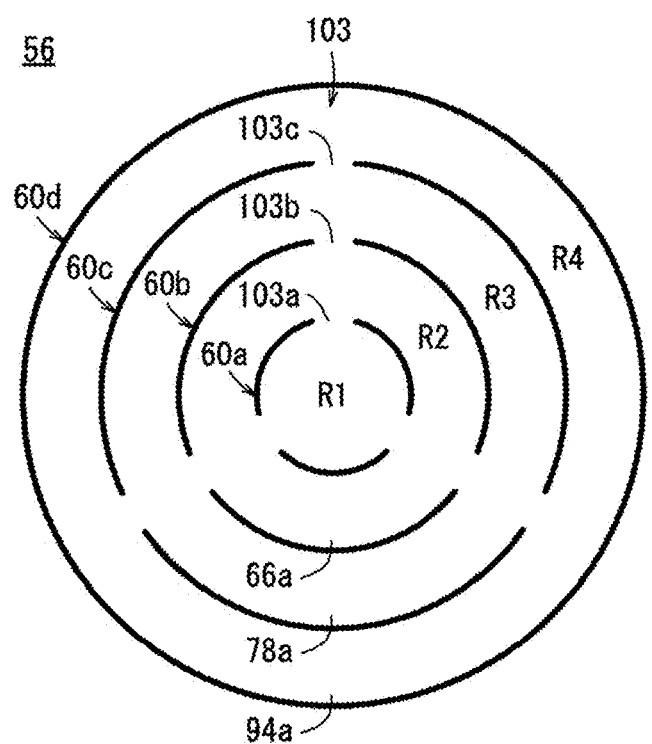
FIG. 7 is a plan view showing the condensed water collecting mechanism.

The positions of the first condensed water holes 103a are the lowest, and the positions of the third condensed water holes 103c are the highest. As shown in FIG. 7, the number of the first condensed water holes 103a is three, the number of the second condensed water holes 103b is three, and the number of the third condensed water holes 103c is three. However, the number of each of the first, second, and third condensed water holes 103a, 103b, 103c may be four or more. The first condensed water holes 103a, the second condensed water holes 103b, and the third condensed water holes 103c are arranged in an annular pattern, respectively. In the first embodiment, the first condensed water holes 103a, the second condensed water holes 103b, and the third condensed water holes 103c are arranged in virtual straight lines at predetermined equal intervals of angle extending radially from the center of the FC peripheral equipment 56.

Figure 8:
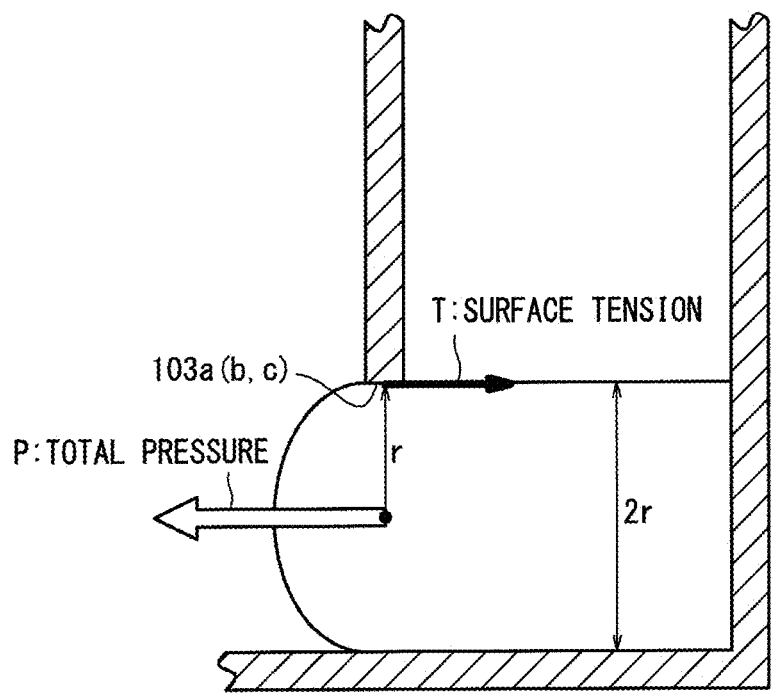
FIG. 8 is a view showing a condensed water hole of the condensed water collection mechanism.

Each of the first condensed water holes 103a, the second condensed water holes 103b, and the third condensed water holes 103c has an opening of 8 mm or more in diameter (2r). As shown FIG. 8, in order to allow the condensed water to flow through the first condensed water holes 103a, the second condensed water holes 103b, and the third condensed water holes 103c, the surface tension T needs to be smaller than the total pressure P generated in the opening area (total pressure P>surface tension T).

Where the radius of the opening is r, the density of water is p, the gravitational acceleration is g, and the surface tension of the water is T, then $r \times \rho g \times \pi r^2 > 2\pi r \times T$, and the relationship of $r > 3.85$ [mm] is obtained. That is, since $2r > 7.7$ [mm], the diameter of the opening (opening diameter) has a size of 8 mm or more.

Further, it is preferable to determine the upper limit value of the opening diameter such that, for example, the pressure loss in the first condensed water holes 103a becomes 10% or less of the pressure loss in the first combustion gas holes 62a. The upper limit value of the opening diameter is calculated based on the number and the opening diameter of the first combustion gas holes 62a, the number and the opening diameter of first condensed water holes 103a, from the ratio of "the total cross sectional area of the first combustion gas holes 62a":"the total cross sectional area of the first condensed water holes 103a"=10:1.

As shown in FIG. 2, a collection pipe 105 is provided inside the first partition plate 60a at a lower position of the first area R1. For example, the collection pipe 105 is connected to a position in the middle of the raw fuel supply channel 88. In the structure, the water vapor vaporized again by the exhaust gas in the first area R1 can be collected, and used as reforming water vapor.

As shown in FIG. 1, the raw fuel supply apparatus 14 includes a raw fuel channel 104. The raw fuel channel 104 branches through a raw fuel regulator valve 106 into the raw fuel supply channel 88 and the raw fuel supply pipe 58. A desulfurizer 108 for removing sulfur compounds in the city gas (raw fuel) is provided in the raw fuel supply channel 88.

The oxygen-containing gas supply apparatus 16 includes an oxygen-containing gas channel 110. The oxygen-containing gas channel 110 branches through an oxygen-containing gas regulator valve 112 into the oxygen-containing gas supply pipe 72 and the air supply pipe 57. The water supply apparatus 18 is connected to the evaporator 48 through the water channel 100.

Figure 5:
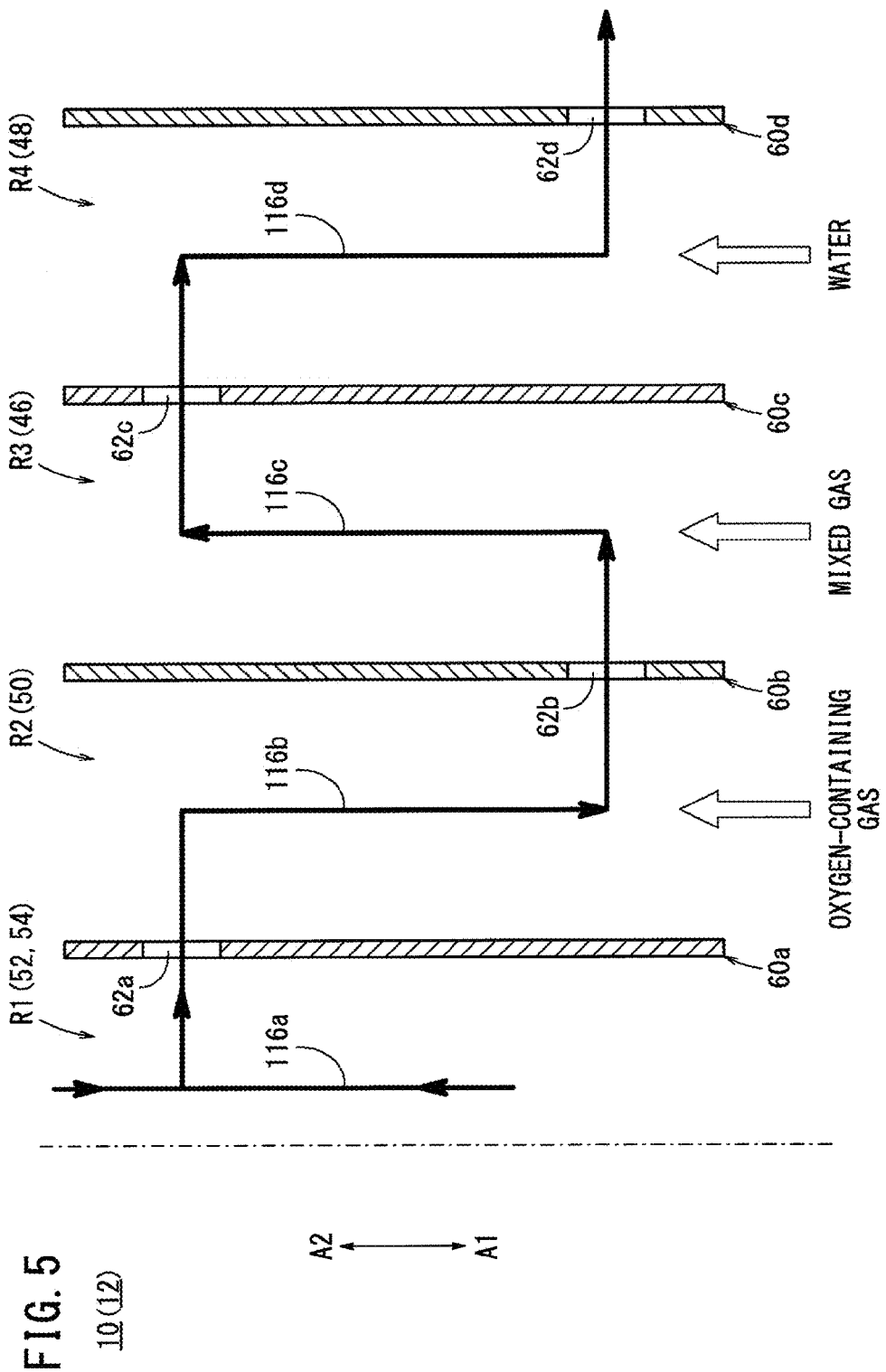
FIG. 5 is a view showing gas flows of a combustion gas in the FC peripheral equipment.

In the first embodiment, as schematically shown in FIG. 5, a first combustion gas channel 116a, which serves as a passage for the combustion gas, is formed in the first area R1, a second combustion gas channel 116b, which serves as a passage for the combustion gas in the direction of the arrow A1, is formed in the second area R2, a third combustion gas channel 116c, which serves as a passage for the combustion gas in the direction of the arrow A2, is formed in the third area R3, and a fourth combustion gas channel 116d, which serves as a passage for the combustion gas in the direction of the arrow A1, is formed in the fourth area R4.

Next, operations of the fuel cell system 10 will be described below.

At the time of starting operation of the fuel cell system 10, air (oxygen-containing gas) and raw fuel are supplied to the start-up combustor 54. Specifically, air is supplied to the oxygen-containing gas channel 110 by the operation of the air pump of the oxygen-containing gas supply apparatus 16. More specifically, air is supplied to the air supply pipe 57 by adjusting the opening angle of the oxygen-containing gas regulator valve 112.

In the meantime, in the raw fuel supply apparatus 14, by operation of the fuel gas pump, for example, raw fuel such as city gas (containing $CH_4$, $C_2H_6$, $C_3H_8$, and $C_4H_{10}$) is supplied to the raw fuel channel 104. Raw fuel is supplied into the raw fuel supply pipe 58 by regulating the opening angle of the raw fuel regulator valve 106. The raw fuel is mixed with air, and is supplied into the start-up combustor 54 (see FIG. 2).

Thus, mixed gas of raw fuel and air is supplied into the start-up combustor 54, and the mixed gas is ignited to start combustion. Therefore, in the exhaust gas combustor 52, which is connected directly to the start-up combustor 54, the combustion gas from the start-up combustor 54 flows into the first partition plate 60a.

As shown in FIG. 5, the plurality of first combustion gas holes 62a are formed at the end of the first partition plate 60a close to the fuel cell stack 24. Thus, combustion gas supplied into the first partition plate 60a passes through the first combustion gas holes 62a, whereupon the combustion gas flows from the first area R1 into the second area R2.

In the second area R2, the combustion gas flows in the direction of the arrow A1, and then the combustion gas flows through the second combustion gas holes 62b formed in the second partition plate 60b and into the third area R3. In the third area R3, the combustion gas flows in the direction of the arrow A2, and then the combustion gas flows through the third combustion gas holes 62*c* formed in the third partition plate 60*c* and into the fourth area R4. In the fourth area R4, the combustion gas flows in the direction of the arrow A1, and then the combustion gas is discharged to the exterior through the fourth combustion gas holes 62*d* formed in the fourth partition plate 60*d*.

The heat exchanger 50 is provided in the second area R2, the reformer 46 is provided in the third area R3, and the evaporator 48 is provided in the fourth area R4. Thus, combustion gas, which is discharged from the first area R1, heats the heat exchanger 50, then heats the reformer 46, and then heats the evaporator 48.

After the temperature of the fuel cell module 12 has been raised to a predetermined temperature, the oxygen-containing gas is supplied into the heat exchanger 50, and the mixed gas of raw fuel and water vapor is supplied into the reformer 46.

More specifically, the opening angle of the oxygen-containing gas regulator valve 112 is adjusted such that the flow rate of air supplied to the oxygen-containing gas supply pipe 72 is increased. In addition, the opening angle of the raw fuel regulator valve 106 is adjusted such that the flow rate of the raw fuel supplied to the raw fuel supply channel 88 is increased. Further, by operation of the water supply apparatus 18, water is supplied to the water channel 100.

Thus, as shown in FIGS. 2 and 3, air that has flowed into the heat exchanger 50 is temporarily supplied to the oxygen-containing gas supply chamber 70*a*. While air moves inside the heat exchange pipes 64, the air is heated by means of heat exchange with the combustion gas supplied into the second area R2. After the heated air has temporarily been supplied to the oxygen-containing gas discharge chamber 70*b*, the air is supplied to the oxygen-containing gas supply passage 42*a* of the fuel cell stack 24 through the oxygen-containing gas channel 74 (see FIG. 1).

In the fuel cell stack 24, after the heated air has flowed through the oxygen-containing gas flow field 38, the oxygen-containing gas is discharged from the oxygen-containing gas discharge passage 42*b* and into the oxygen-containing exhaust gas channel 63*a*. The oxygen-containing exhaust gas channel 63*a* opens toward the inside of the first partition plate 60*a* of the exhaust gas combustor 52, so that the oxygen-containing exhaust gas can flow into the first partition plate 60*a*.

Further, as shown in FIG. 1, water from the water supply apparatus 18 is supplied to the evaporator 48. After sulfur has been removed from the raw fuel at the desulfurizer 108, the raw fuel flows through the raw fuel supply channel 88 and moves toward the reformer 46.

In the evaporator 48, after water has temporarily been supplied to the water supply chamber 98*a*, while the water moves inside the evaporation pipes 92, the water is heated by means of the combustion gas that flows through the fourth area R4, and the water is vaporized. After water vapor has flowed into the water vapor discharge chamber 98*b*, the water vapor is supplied to the evaporation return pipe 102, which is connected to the water vapor discharge chamber 98*b*. Thus, water vapor flows inside the evaporation return pipe 102, and further flows into the raw fuel supply channel 88. Then, the water vapor becomes mixed with the raw fuel to produce the mixed gas.

The mixed gas from the raw fuel supply channel 88 is temporarily supplied to the mixed gas supply chamber 82*a* of the reformer 46. The mixed gas moves inside the reforming pipes 76. In the meantime, the mixed gas is heated by means of the combustion gas that flows through the third area R3. Steam reforming is performed by the catalyst pellets 84. After removal (reforming) of $C_{2+}$ hydrocarbons, a reformed gas chiefly containing methane is obtained.

After the reformed gas is heated, the reformed gas is temporarily supplied as a fuel gas to the reformed gas discharge chamber 82*b*. Thereafter, the fuel gas is supplied to the fuel gas supply passage 44*a* of the fuel cell stack 24 through the fuel gas channel 90 (see FIG. 1).

In the fuel cell stack 24, after the heated fuel gas has flowed through the fuel gas flow field 40, the fuel gas is discharged from the fuel gas discharge passage 44*b* and into the fuel exhaust gas channel 63*b*. The fuel exhaust gas channel 63*b* opens toward the inside of the first partition plate 60*a* of the exhaust gas combustor 52, so that the fuel exhaust gas can be supplied into the first partition plate 60*a*.

Under a heating operation of the start-up combustor 54, when the temperature of the fuel gas in the exhaust gas combustor 52 exceeds the self-ignition temperature, combustion is initiated in the first partition plate 60*a* between the oxygen-containing exhaust gas and the fuel exhaust gas.

In the FC peripheral equipment 56, the combustion gas flows through the first area R1, then, the second area R2, then, the third area R3, and then, four area R4 for heat exchange. Thereafter, the combustion gas is discharged to the exterior. At this time, the water vapor in the combustion gas is condensed by the decrease in the temperature of the combustion gas, and tends to be retained in the fourth area R4 where in particular, the temperature becomes relatively low.

As shown in FIG. 6, the condensed water retained in the fourth area R4 moves through the third condensed water holes 103*c* of the condensed water collecting mechanism 103 formed on the lower side of the third partition plate 60*c*, toward the third area R3. When the amount of the condensed water retained in the third area R3 reaches a predetermined amount or more, the condensed water flows through the second condensed water holes 103*b* formed on the lower side of the second partition plate 60*b*, toward the second area R2.

When the amount of the condensed water retained in the second area R2 reaches a predetermined amount or more, the condensed water moves through the first condensed water holes 103*a* formed in the first partition plate 60*a*, toward the first area R1. In the first area R1, since a hot exhaust gas is produced, the condensed water is vaporized into water vapor. The water vapor (containing the condensed water) is collected by the collection pipe 105.

In the first embodiment, the FC peripheral equipment 56 includes the first area R1 where the exhaust gas combustor 52 and the start-up combustor 54 are provided, the annular second area R2 disposed around the first area R1 where the heat exchanger 50 is provided, the annular third area R3 disposed around the second area R2 where the reformer 46 is provided, and the annular fourth area R4 disposed around the third area R3 where the evaporator 48 is provided.

More specifically, the annular second area R2 is disposed in the center around the first area R1, the annular third area R3 is disposed around the second area R2, and the annular fourth area R4 is disposed around the third area R3. In such a structure, hot temperature equipment with a large heat demand such as the heat exchanger 50 (and the reformer 46) can be provided on the inside, whereas low temperature equipment with a small heat demand such as the evaporator 48 can be provided on the outside.

For example, the heat exchanger 50 requires a temperature in a range of 550° C. to 650° C., and the reformer 46 requires a temperature in a range of 550° C. to 600° C. Further, the evaporator 48 requires a temperature in a range of 150° C. to 200° C.

Thus, an improvement in heat efficiency is achieved, and a thermally self-sustaining operation is facilitated. Further, a simple and compact structure can be achieved. In particular, since the heat exchanger 50 is provided inside the reformer 46 in an environment where the A/F (air/fuel gas) ratio is relatively low, the reformer 46, which is suitable for carrying out reforming at low temperatures, can be used advantageously. The phrase "thermally self-sustaining operation herein implies an operation in which the operating temperature of the fuel cell 22 is maintained using only heat generated in the fuel cell 22 itself, without supplying additional heat from the exterior.

Further, the FC peripheral equipment 56 includes the condensed water collecting mechanism 103. Thus, the condensed water produced by condensation of the water vapor in the combustion gas flows from the fourth area R4, then, third area R3, then, the second area R2, and then, the first area R1. That is, the condensed water can flow from the low temperature side to the high temperature side.

Thus, the change of the condensed water again into the vapor phase is facilitated, and the condensed water is not retained in the FC peripheral equipment 56. Accordingly, degradation in the durability of the FC peripheral equipment 56 is suppressed as much as possible, and it becomes possible to utilize the collected condensed water to obtain water vapor for reforming.

Further, in the first embodiment, as shown in FIGS. 2, 3 and 5, the reformer 46 includes the annular mixed gas supply chamber 82a, the annular reformed gas discharge chamber 82b, the reforming pipes 76, and the third combustion gas channel 116c. Mixed gas is supplied to the mixed gas supply chamber 82a, and the produced fuel gas is discharged to the reformed gas discharge chamber 82b. The reforming pipes 76 are connected at one end thereof to the mixed gas supply chamber 82a, and are connected at the other end thereof to the reformed gas discharge chamber 82b. The third combustion gas channel 116c supplies the combustion gas into the space between the reforming pipes 76.

The evaporator 48 includes the annular water supply chamber 98a, the annular water vapor discharge chamber 98b, the evaporation pipes 92, and the fourth combustion gas channel 116d. Water is supplied to the water supply chamber 98a, and water vapor is discharged to the water vapor discharge chamber 98b. The evaporation pipes 92 are connected at one end thereof to the water supply chamber 98a, and are connected at the other end thereof to the water vapor discharge chamber 98b. The fourth combustion gas channel 116d supplies the combustion gas into the space between the evaporation pipes 92.

The heat exchanger 50 includes the annular oxygen-containing gas supply chamber 70a, the annular oxygen-containing gas discharge chamber 70b, the heat exchange pipes 64, and the second combustion gas channel 116b. Oxygen-containing gas is supplied to the oxygen-containing gas supply chamber 70a, and the heated oxygen-containing gas is discharged to the oxygen-containing gas discharge chamber 70b. The heat exchange pipes 64 are connected at one end thereof to the oxygen-containing gas supply chamber 70a, and are connected at the other end thereof to the oxygen-containing gas discharge chamber 70b. The second combustion gas channel 116b supplies the combustion gas into the space between the heat exchange pipes 64.

As described above, the annular supply chambers (mixed gas supply chamber 82a, water supply chamber 98a, and the oxygen-containing gas supply chamber 70a), the annular discharge chambers (reformed gas discharge chamber 82b, water vapor discharge chamber 98b, oxygen-containing gas discharge chamber 70b), and the pipes (reforming pipes 76, evaporation pipes 92, and heat exchange pipes 64) are provided as a basic structure. Thus, a simple structure can easily be achieved. Accordingly, the production cost of the entire fuel cell module 12 is reduced effectively. Further, by changing various parameters, such as the volumes of the supply chambers and the discharge chambers, the length, the diameter, and the number of pipes, a desired operation can be achieved depending on various operating conditions, and a wider variety of designs becomes available.

Further, the combustion gas flows through the first combustion gas channel 116a in the first area R1, then, the second combustion gas channel 116b in the second area R2, then, the third combustion gas channel 116c in the third area R3, and then, the fourth combustion gas channel 116d in the fourth area R4. Thereafter, the combustion gas is discharged to the exterior of the fuel cell module 12. Thus, it becomes possible to effectively supply the heat to the exhaust gas combustor 52, the heat exchanger 50, the reformer 46, and the evaporator 48 of the FC peripheral equipment 56. Accordingly, improvement in the heat efficiency is achieved, and thermally self-sustaining operation can be facilitated.

Moreover, the oxygen-containing gas supply chamber 70a is formed between the first inner ring 66a to which the ends of the heat exchange pipes 64 are inserted and the first outer ring 68a spaced from the first inner ring 66a. The oxygen-containing gas discharge chamber 70b is formed between the first inner ring 66b to which the ends of the heat exchange pipes 64 are inserted and the first outer ring 68b spaced from the first inner ring 66b. The mixed gas supply chamber 82a is formed between the second inner ring 78a to which the ends of the reforming pipes 76 are inserted and the second outer ring 80a spaced from the second inner ring 78a. The reformed gas discharge chamber 82b is formed between the second inner ring 78b to which the ends of the reforming pipes 76 are inserted and the second outer ring 80b spaced from the second inner ring 78b. The water supply chamber 98a is formed between the third inner ring 94a to which the ends of the evaporation pipes 92 are inserted and the third outer ring 96a spaced from the third inner ring 94a. The water vapor discharge chamber 98b is formed between the third inner ring 94b to which the ends of the evaporation pipes 92 are inserted and the third outer ring 96b spaced from the third inner ring 94b.

Therefore, the oxygen-containing gas supply chamber 70a is formed between the first inner ring 66a and the first outer ring 68a, the oxygen-containing gas discharge chamber 70b is formed between the first inner ring 66b and the first outer ring 68b, the mixed gas supply chamber 82a is formed between the second inner ring 78a and the second outer ring 80a, the reformed gas discharge chamber 82b is formed between the second inner ring 78b and the second outer ring 80b, the water supply chamber 98a is formed between the third inner ring 94a and the third outer ring 96a, and the water vapor discharge chamber 98b is formed between the third inner ring 94b and the third outer ring 96b. Thus, structure is simplified effectively. Accordingly, the production cost of the fuel cell module 12 is reduced effectively, and size reduction is achieved easily.

Further, the reformed gas discharge chamber 82b, the water vapor discharge chamber 98b, and the oxygen-containing gas discharge chamber 70b are provided on an upper end side close to the fuel cell stack 24, whereas the mixed gas supply chamber 82a, the water supply chamber 98a, and the oxygen-containing gas supply chamber 70a are provided on a lower end side opposite from the fuel cell stack 24.

In such a structure, reactant gases (fuel gas and oxygen-containing gas), immediately after being raised in temperature and reforming thereof, can be supplied promptly to the fuel cell stack 24. Further, while a decrease in temperature due to radiant heat is minimized, exhaust gas from the fuel cell stack 24 can be supplied to the reformer 46, the evaporator 48, the heat exchanger 50, and the exhaust gas combustor 52 of the FC peripheral equipment 56. Accordingly, an improvement in heat efficiency is achieved, and a thermally self-sustaining operation is facilitated.

Further, the FC peripheral equipment 56 includes the first partition plate 60a provided vertically between the first area R1 and the second area R2, the second partition plate 60b provided vertically between the second area R2 and the third area R3, and the third partition plate 60c provided vertically between the third area R3 and the fourth area R4.

The condensed water collecting mechanism 103 includes the first condensed water holes 103a formed on the lower side of the first partition plate 60a opposite to the upper side which is closer to the fuel cell stack 24, the second condensed water holes 103b formed on the lower side of the second partition plate 60b, and the third condensed water holes 103c formed on the lower side of the third partition plate 60c. The positions of the holes gets higher from the first condensed water holes 103a, toward the second condensed water holes 103b, and from the second condensed water holes 103b toward the third condensed water holes 103c. That is, the positions of the second condensed water holes 103b are higher than the first condensed water holes 103a, and the positions of the third condensed water holes 103c are higher than the positions of the second condensed water holes 103b.

In the structure, blowing of the combustion gas can be suppressed suitably, further improvement in the heat efficiency is achieved, and thermally self-sustaining operation can be facilitated reliably. Further, the condensed water can flow from the outer side (low temperature side) to the inner side (high temperature side) of the FC peripheral equipment 56 through the first condensed water holes 103a, the second condensed water holes 103b, and the third condensed water holes 103c provided in the first partition plate 60a, the second partition plate 60b, and the third partition plate 60c, respectively. Thus, the change of the condensed water again into the vapor phase is facilitated, and the condensed water is not retained in the FC peripheral equipment 56. Accordingly, degradation in the durability of the FC peripheral equipment 56 is suppressed as much as possible, and it becomes possible to utilize the collected condensed water to obtain water vapor for reforming.

Further, as shown in FIG. 7, the number of the first condensed water holes 103a is at least three, the number of the second condensed water holes 103b is at least three, and the number of the third condensed water holes 103c is at least three. The first condensed water holes 103a, the second condensed water holes 103b, and the third condensed water holes 103c are arranged in an annular pattern, respectively. In the structure, for example, depending on the condition where the FC peripheral equipment 56, even if the FC peripheral equipment 56 is tilted, the condensed water can be collected reliably. Accordingly, degradation in the durability of the FC peripheral equipment 56 is suppressed as much as possible.

Each of the first condensed water holes 103a, the second condensed water holes 103b, and the third condensed water holes 103c has an opening of 8 mm or more in diameter. Thus, the flow of the condensed water is not prevented by the surface tension of the condensed water, and the condensed water can be collected reliably. Accordingly, degradation in the durability of the FC peripheral equipment 56 is suppressed as much as possible.

Further, in the evaporator 48, at least one of the evaporation pipes 92 forms an evaporation return pipe 102, which connects the water vapor discharge chamber 98b and the mixed gas supply chamber 82a of the reformer 46. Thus, in a state in which the water vapor is kept hot, the water vapor is mixed with the raw fuel in the mixed gas supply chamber 82a of the reformer 46 to thereby obtain the mixed gas. Accordingly, an improvement in reforming efficiency is achieved.

Further, the fuel cell module 12 is a solid oxide fuel cell module. Therefore, the fuel cell module 12 is applicable to high temperature type fuel cells such as SOFC.

Figure 9:
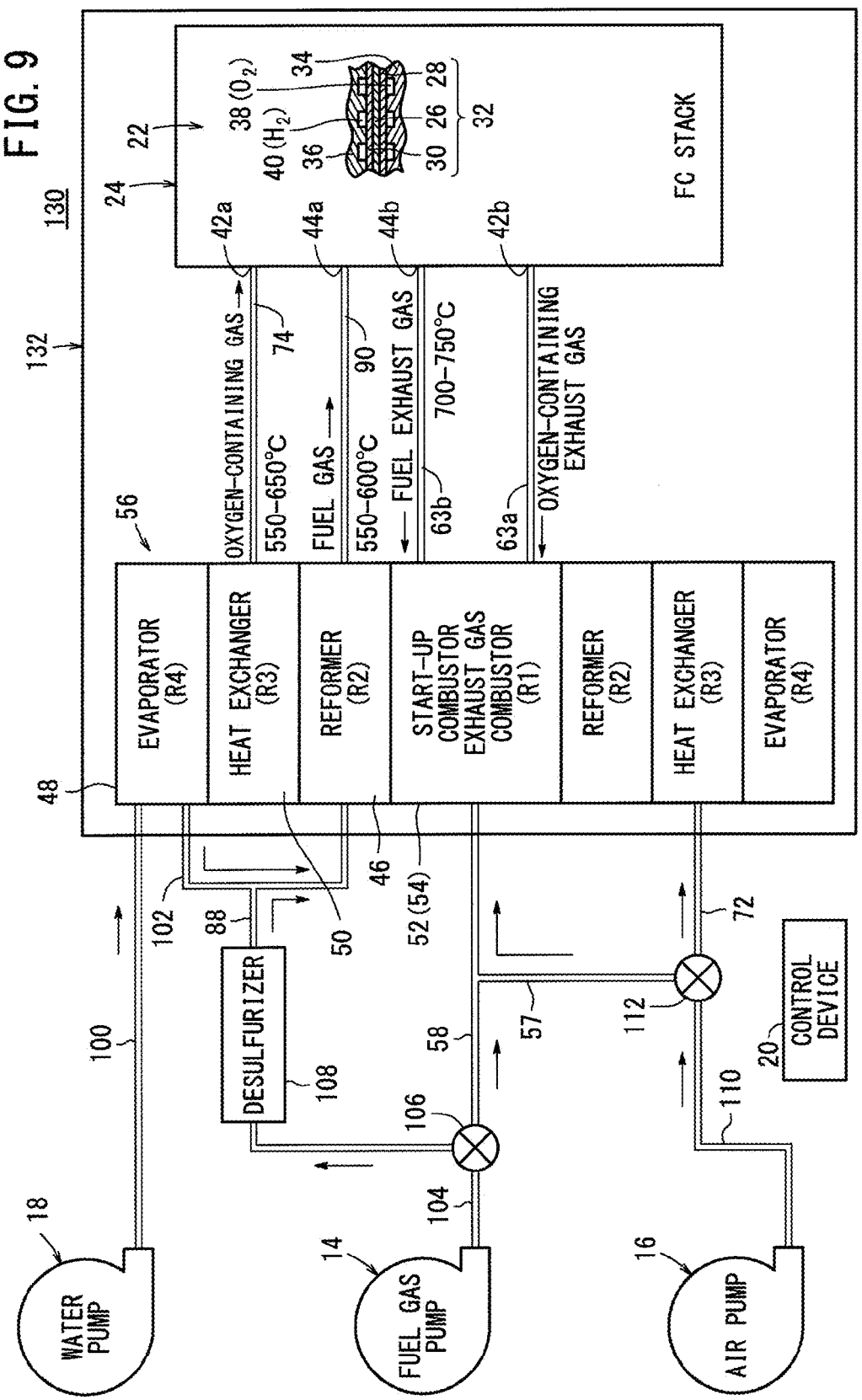
FIG. 9 is a diagram schematically showing the structure of a fuel cell system including a fuel cell module according to a second embodiment of the present invention.

As shown in FIG. 9, a fuel cell system 130 includes a fuel cell module 132 according to a second embodiment of the present invention. Constituent elements of the fuel cell module 132 according to the second embodiment of the present invention, which are identical to those of the fuel cell module 12 according to the first embodiment, are labeled with the same reference numerals, and descriptions of such features are omitted. Also in third and fourth embodiments as described later, the constituent elements that are identical to those of the fuel cell module 12 according to the first embodiment are labeled with the same reference numerals, and descriptions thereof will be omitted.

Figure 10:
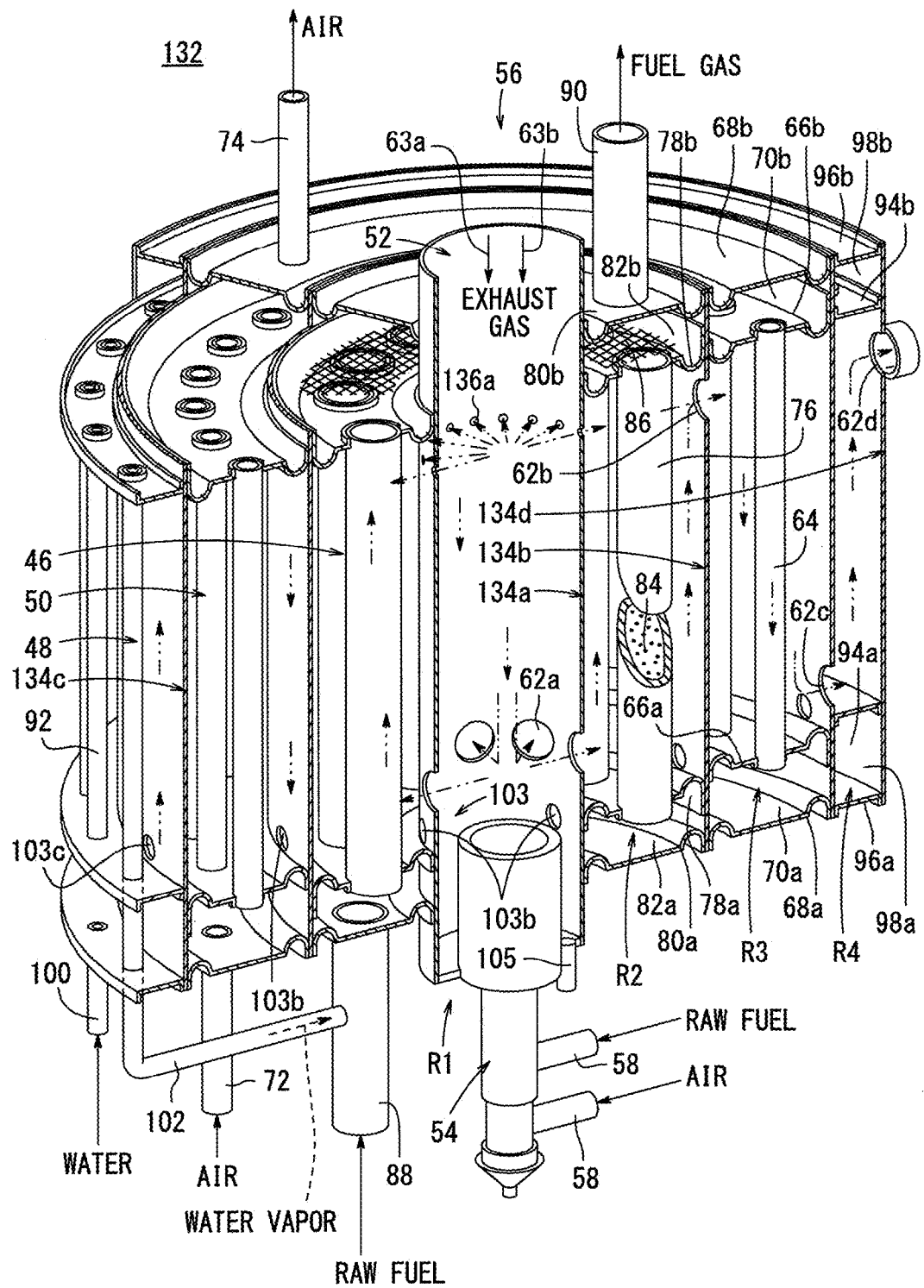
FIG. 10 is a perspective view with partial omission showing FC peripheral equipment of the fuel cell module.

As shown in FIG. 10, the fuel cell module 132 includes a first area R1 comprising, e.g., a circular opening where an exhaust gas combustor 52 and a start-up combustor 54 are provided, an annular second area R2 disposed around the first area R1 where the reformer 46 is provided, an annular third area R3 disposed around the second area R2 where the heat exchanger 50 is provided, and an annular fourth area R4 disposed around the third area R3 where the evaporator 48 is provided.

The FC peripheral equipment 56 includes a first partition plate 134a provided between the first area R1 and the second area R2, a second partition plate 134b provided between the second area R2 and the third area R3, a third partition plate 134c provided between the third area R3 and the fourth area R4, and a fourth partition plate 134d disposed around the fourth area R4.

Figure 11:
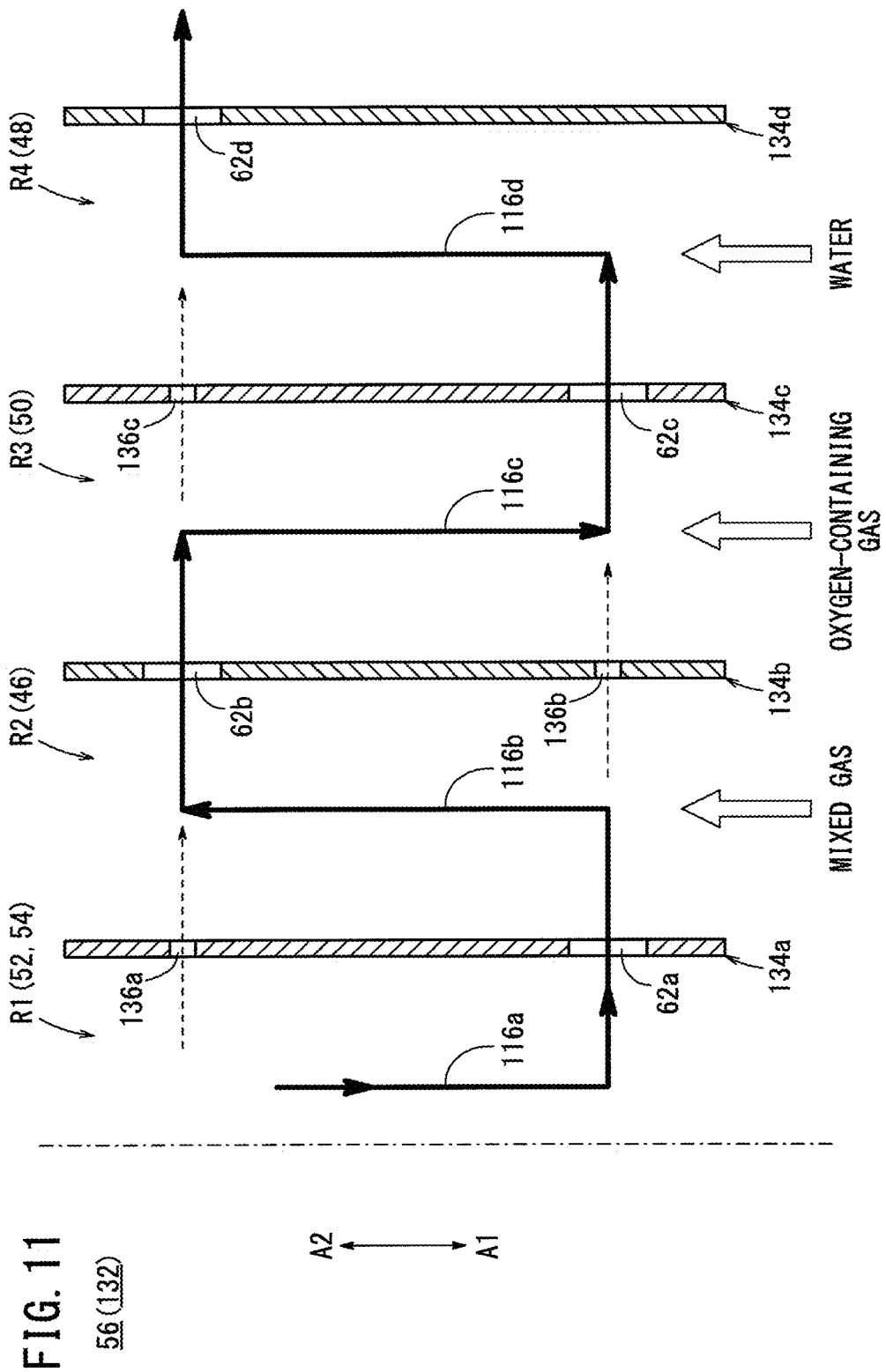
FIG. 11 is a view showing gas flows of a combustion gas in the FC peripheral equipment.

As shown in FIGS. 10 and 11, first combustion gas holes 62a are provided adjacent to an end of the first partition plate 134a opposite from the fuel cell stack 24, second combustion gas holes 62b are provided adjacent to an end of the second partition plate 134b close to the fuel cell stack 24, third combustion gas holes 62c are provided near an end of the third partition plate 134c opposite from the fuel cell stack 24, and fourth combustion gas holes 62d are provided adjacent to an end of the fourth partition plate 134d close to the fuel cell stack 24.

Figure 12:
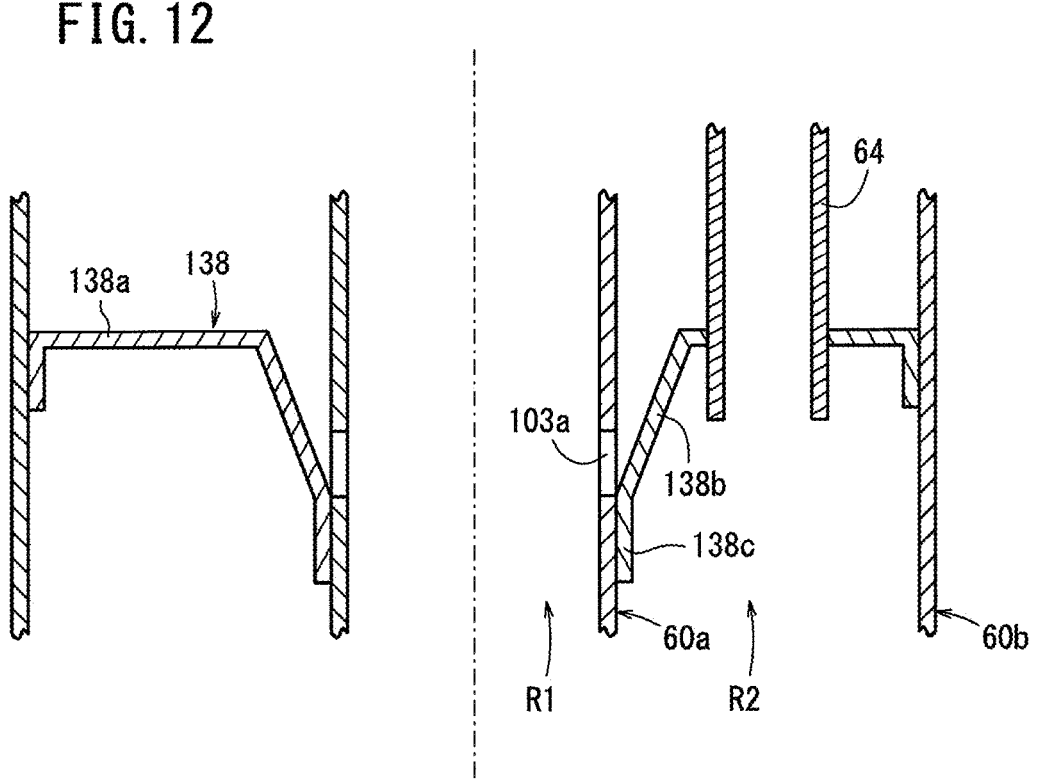
FIG. 12 is a view showing an inner ring having another structure.

A plurality of gas extraction holes 136a are formed in the first partition plate 134a opposite from the first combustion gas holes 62a. Each of the gas extraction holes 136a has an opening area, which is smaller than each of the opening areas of the first combustion gas holes 62a. As shown in FIGS. 11 and 12, the gas extraction holes 136a are formed at positions confronting the second combustion gas holes 62b formed in the second partition plate 134b. A plurality of gas extraction holes 136b are formed in the second partition plate 134b at positions confronting the third combustion gas holes 62c formed in the third partition plate 134c. A plurality of gas extraction holes 136c are formed in the third partition plate 134c at positions confronting the fourth combustion gas holes 62d formed in the fourth partition plate 134d. The gas extraction holes 136b, 136c are not essential, and may be provided only as necessary.

The FC peripheral equipment 56 includes the condensed water collecting mechanism 103 for collecting condensed water produced by condensation of water vapor in the combustion gas by allowing the condensed water to flow through the fourth area R4, then, the third area R3, then, the second area R2, and then, the first area R1.

In the second embodiment, the fuel cell module 132 includes the first area R1 where the exhaust gas combustor 52 and the start-up combustor 54 are provided, the annular second area R2 disposed around the first area R1 where the reformer 46 is provided, the annular third area R3 disposed around the second area R2 where the heat exchanger 50 is provided, and the annular fourth area R4 disposed around the third area R3 where the evaporator 48 is provided.

In this structure, hot temperature equipment with a large heat demand such as the reformer 46 (and the heat exchanger 50) are provided on the inside, and low temperature equipment with a small heat demand such as the evaporator 48 are provided on the outside. Accordingly, an improvement in heat efficiency is achieved, and a thermally self-sustaining operation is facilitated easily. Further, a simple and compact structure is achieved.

Further, the FC peripheral equipment 56 includes the condensed water collecting mechanism 103. By the condensed water collecting mechanism 103, the condensed water produced by condensation of the water vapor in the combustion gas flows from the fourth area R4, then, third area R3, then, the second area R2, and then, the first area R1. That is, the condensed water flows from the low temperature side to the high temperature side. Thus, the change of the condensed water again into the vapor phase is facilitated, and the condensed water is not retained in the FC peripheral equipment 56. Accordingly, the same advantages as in the case of the first embodiment are obtained. For example, degradation in the durability of the FC peripheral equipment 56 is suppressed as much as possible, and it becomes possible to utilize the collected condensed water to obtain water vapor for reforming.

FIG. 12 shows an inner ring 138 having another structure. The inner ring 138 has a flat portion 138a, and a heat exchange pipe 64 is joined to the flat portion 138a. A cylindrical portion 138b inclined downward is provided integrally with the inner side of the flat portion 138a. A cylindrical portion 138c joined to the first partition plate 60a is provided at the end of the inclined cylindrical portion 138b. The first condensed water holes 103a are provided adjacent to the border between the cylindrical portion 138c and the inclined cylindrical portion 138b.

As described above, in the inner ring 138, the condensed water is guided smoothly and reliably from the second area R2 to the first condensed water holes 103a. The inner ring 138 has elasticity to exert the function to absorb the heat stress, for example.

Figure 13:
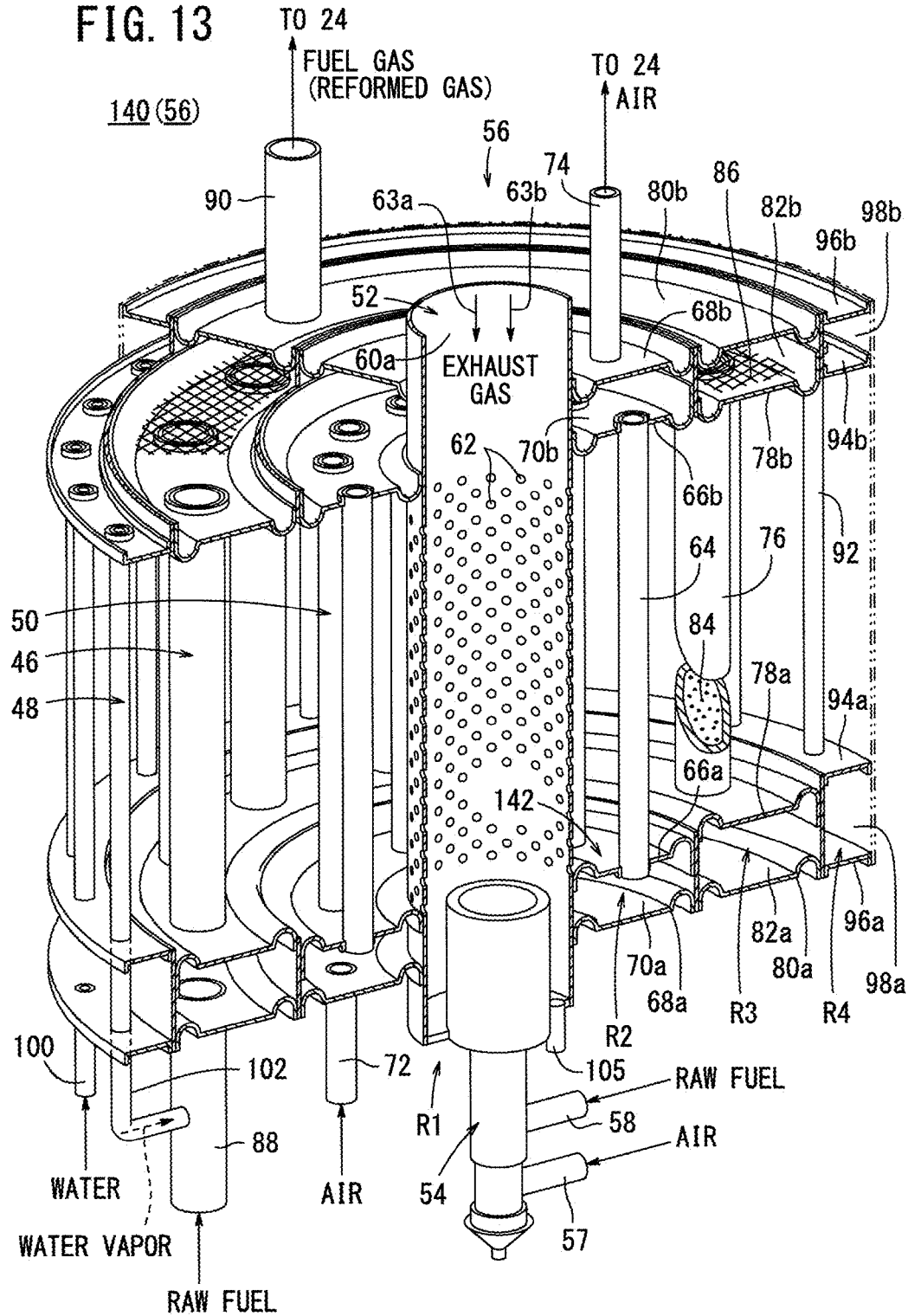
FIG. 13 is a perspective view with partial omission, showing FC peripheral equipment of a fuel cell module according a third embodiment of the present invention.

As shown in FIG. 13, in a fuel cell module 140 according to a third embodiment of the present invention, the FC peripheral equipment 56 does not use the second partition plate 60b, the third partition plate 60c, and the fourth partition plate 60d.

As in the case of the first embodiment, the FC peripheral equipment 56 includes a first area R1 comprising, e.g., a circular opening where the exhaust gas combustor 52 and the start-up combustor 54 are provided, an annular second area R2 formed around the first area R1 where the heat exchanger 50 is provided, an annular third area R3 formed around the second area R2 where the reformer 46 is provided, and an annular fourth area R4 formed around the third area R3 where the evaporator 48 is provided.

The FC peripheral equipment 56 includes a condensed water collecting mechanism 142 for collecting condensed water produced by condensation of water vapor in the combustion gas by allowing the condensed water to flow through the fourth area R4, then, the third area R3, then, the second area R2, and then, the first area R1. The condensed water collecting mechanism 142 includes the upper surface of the first inner ring 66a, the upper surface of the second inner ring 78a, and the upper surface of the third inner ring 94a. The upper surface of the second inner ring 78a (the position of the bottom surface) is higher than the upper surface of the first inner ring 66a, and the upper surface of the third inner ring 94a is higher than the upper surface of the second inner ring 78a. The position of the bottom surface of the second inner ring 78a is higher than the position of the bottom surface of the third inner ring 94a. That is, the bottom surface of the second inner ring 78a is higher than the bottom surface of the first inner ring 66a, and the bottom surface of the third inner ring 94a is higher than the bottom surface of the second inner ring 78a.

In the third embodiment, the condensed water retained in the fourth area R4 moves from the upper surface of the third inner ring 94a at the highest position to the upper surface of the second inner ring 78a in the third area R3. Then, the condensed water moves to the upper surface of the first inner ring 66a which is lower than the upper surface of the second inner ring 78a, i.e., moves to the second area R2. Thereafter, the condensed water flows into the first area R1, and the condensed water is collected into the collection pipe 105.

In the structure, the condensed water can flow from the outer side (low temperature side) to the inner side (high temperature side), and the change of the condensed water again into the vapor phase is facilitated. Thus, the condensed water is not retained in the FC peripheral equipment 56. Accordingly, degradation in the durability of the FC peripheral equipment 56 is suppressed as much as possible, and it becomes possible to utilize the collected condensed water to obtain water vapor for reforming.

Figure 14:
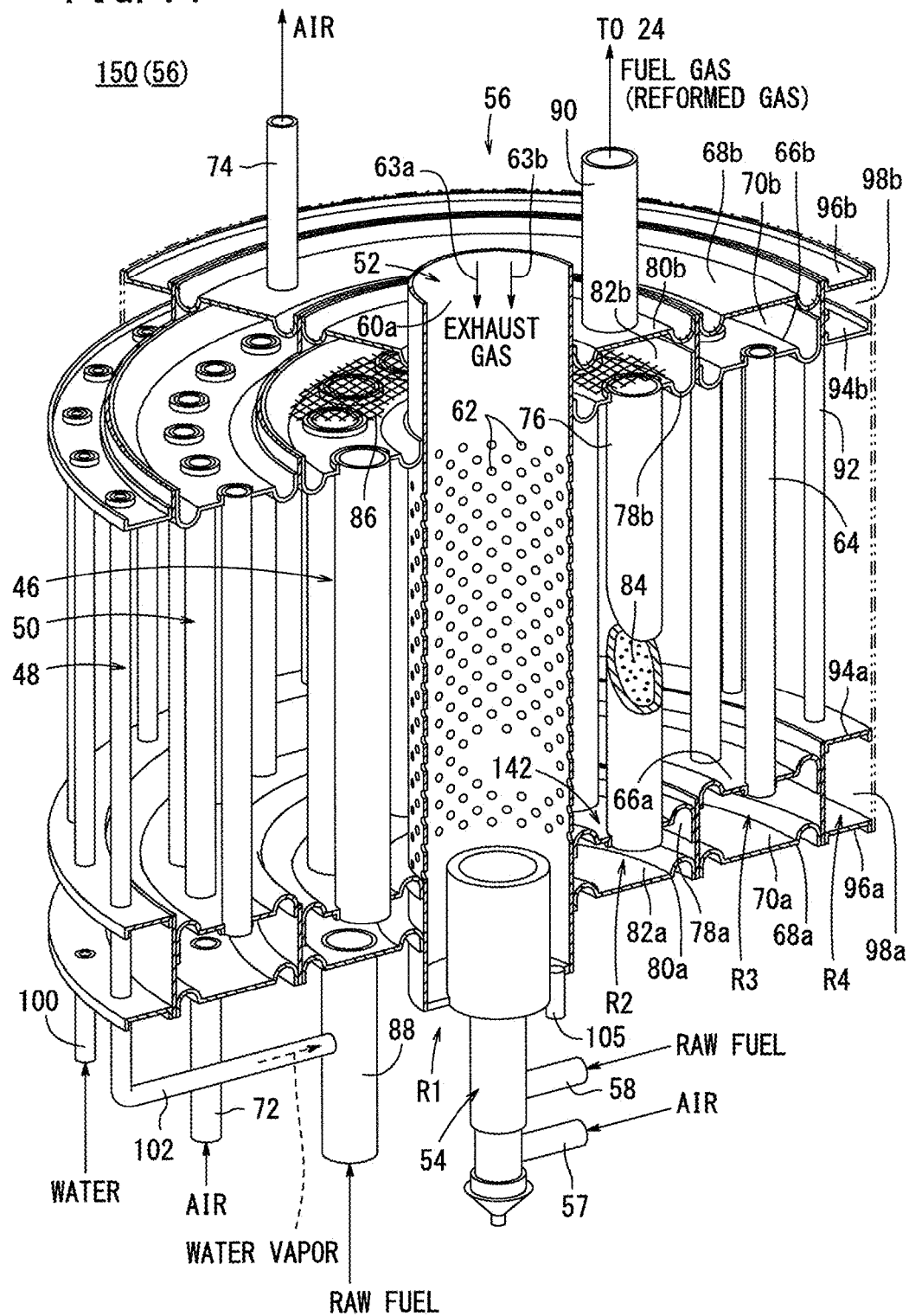
FIG. 14 is a perspective view with partial omission, showing FC peripheral equipment of a fuel cell module according to a fourth embodiment of the present invention.
Figure 15:
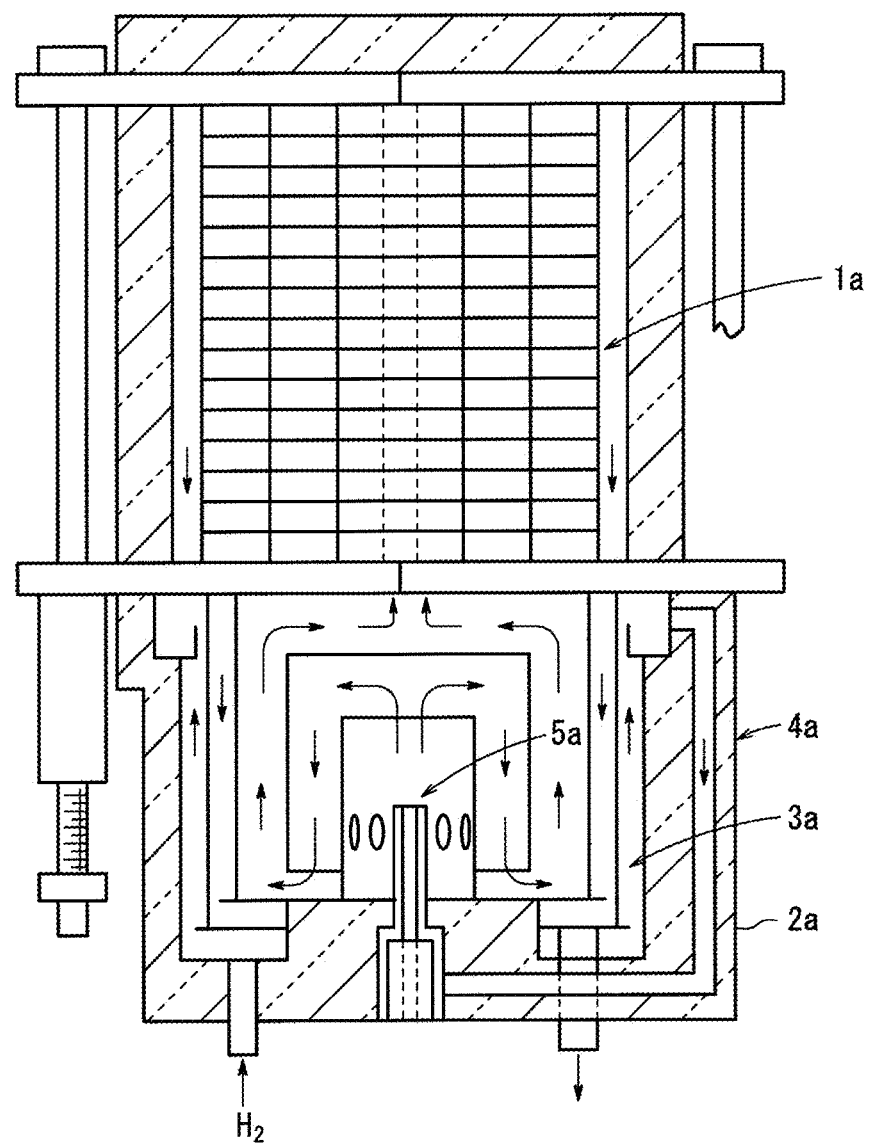
FIG. 15 is a view schematically showing the fuel cell battery disclosed in conventional technique 1.
Figure 16:
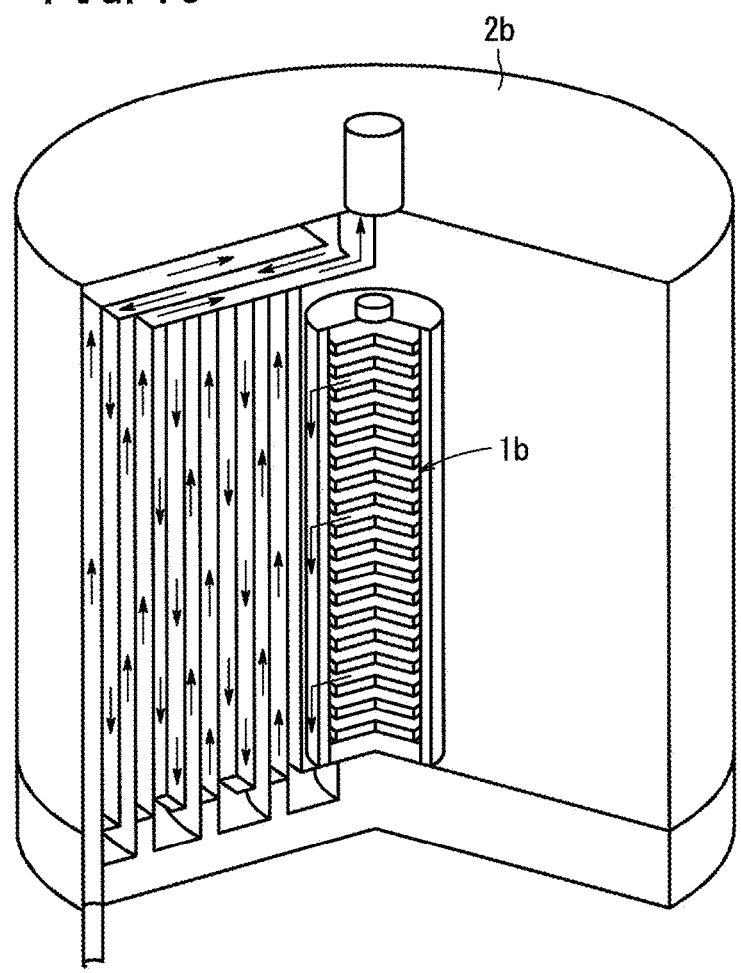
FIG. 16 is a partially cutaway perspective view, showing the solid oxide fuel cell disclosed in conventional technique 2.
Figure 17:
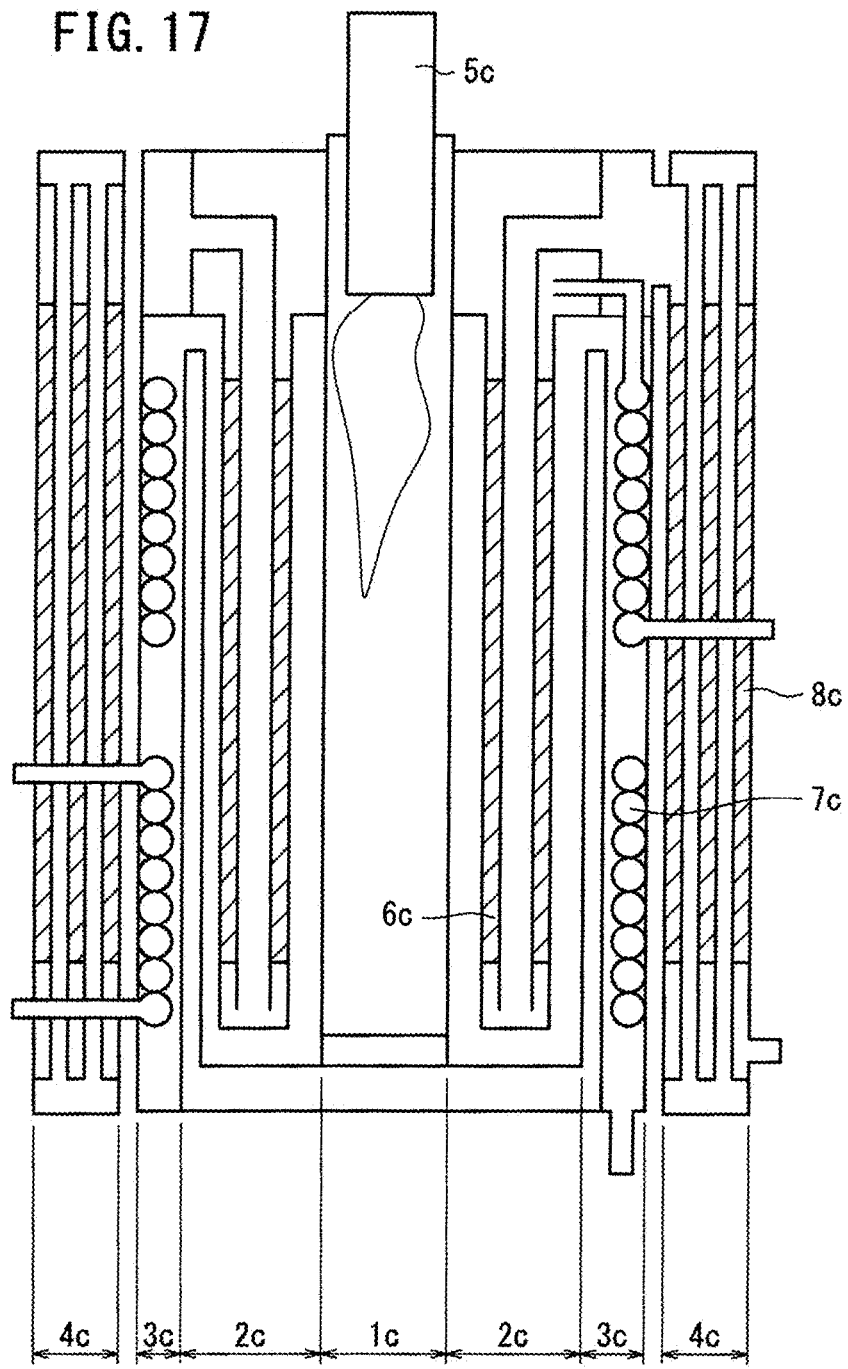
FIG. 17 is a view schematically showing the fuel cell system disclosed in conventional technique 3.

As shown in FIG. 14, in a fuel cell module 150 according to a fourth embodiment of the present invention, as in the case of the second embodiment, the fuel cell module 150 includes a first area R1 comprising, e.g., a circular opening where the exhaust gas combustor 52 and the start-up combustor 54 are provided, an annular second area R2 formed around the first area R1 where the reformer 46 is provided, an annular third area R3 formed around the second area R2 where the heat exchanger 50 is provided, and an annular fourth area R4 formed around the third area R3 where the evaporator 48 is provided.

The FC peripheral equipment 56 includes a condensed water collecting mechanism 142 for collecting condensed water produced by condensation of the water vapor in the combustion gas by allowing the condensed water to flow through the fourth area R4, then, third area R3, then second area R2, and then, the first area R1.

Thus, in the fourth embodiment, the same advantages as in the cases of first to third embodiments are obtained.

Although certain preferred embodiments of the present invention has been shown and described in detail, it should be understood that various changes and modifications may be made therein without departing from the scope of the appended claims.

The invention claimed is:

1. A fuel cell module comprising:
a fuel cell stack formed by stacking fuel cells for generating electricity by electrochemical reactions between a fuel gas and an oxygen-containing gas;
a reformer for reforming a mixed gas of water vapor and a raw fuel chiefly containing hydrocarbon to produce the fuel gas supplied to the fuel cell stack;
an evaporator for evaporating water, and supplying the water vapor to the reformer;
a heat exchanger for raising temperature of the oxygen-containing gas by heat exchange with combustion gas, and supplying the oxygen-containing gas to the fuel cell stack;
an exhaust gas combustor for combusting the fuel gas discharged from the fuel cell stack as a fuel exhaust gas and the oxygen-containing gas discharged from the fuel cell stack as an oxygen-containing exhaust gas to thereby produce the combustion gas; and
a start-up combustor for combusting the raw fuel and the oxygen-containing gas to thereby produce the combustion gas,
the fuel cell module further comprising:
a first area where the exhaust gas combustor and the start-up combustor are provided;
an annular second area disposed around the first area where one of the reformer and the heat exchanger is provided;
an annular third area disposed around the second area where another of the reformer and the heat exchanger is provided;
an annular fourth area disposed around the third area where the evaporator is provided; and
a condensed water collecting mechanism for collecting condensed water produced by condensation of water vapor in the combustion gas by allowing the condensed water to flow the fourth area, then, the third area, then, the second area, and then, the first area, the condensing water collecting mechanism including:
a first ring member that forms a bottom of the second area, a second ring member that forms a bottom of the third area, and a third ring member that forms a bottom of the fourth area,
wherein the bottom of the third ring member is higher than the bottom of the second ring member, and the bottom of the second ring member is higher than the bottom of the first ring member, and
a collection pipe for collecting water vapor is provided at a lower position of the first area.

2. The fuel cell module according to claim 1, wherein the reformer includes an annular mixed gas supply chamber to which the mixed gas is supplied, an annular reformed gas discharge chamber to which the produced fuel gas is discharged, and a plurality of reforming pipes connected at one end to the mixed gas supply chamber, and connected at another end to the reformed gas discharge chamber, and a combustion gas channel for supplying the combustion gas to a space between the reforming pipes;
the evaporator includes an annular water supply chamber to which the water is supplied, an annular water vapor discharge chamber to which the water vapor is discharged, a plurality of evaporation pipes connected at one end to the water supply chamber, and connected at another end to the water vapor discharge chamber, and a combustion gas channel for supplying the combustion gas to a space between the evaporation pipes; and
the heat exchanger includes an annular oxygen-containing gas supply chamber to which the oxygen-containing gas is supplied, an annular oxygen-containing gas discharge chamber to which the heated oxygen-containing gas is discharged, a plurality of heat exchange pipes connected at one end to the oxygen-containing gas supply chamber, and connected at another end to the oxygen-containing gas discharge chamber, and a combustion gas channel for supplying the combustion gas to a space between the heat exchange pipes.

3. The fuel cell module according to claim 2, wherein the combustion gas flows through a combustion gas channel in the first area, then, the combustion gas channel in the second area, then, the combustion gas channel in the third area, and then, the combustion gas channel in the fourth area, and thereafter, the combustion gas is discharged to exterior of the fuel cell module.

4. The fuel cell module according to claim 2, wherein each of the mixed gas supply chamber and the reformed gas discharge chamber is formed between an inner ring to which ends of the reforming pipes are inserted and an outer ring spaced from the inner ring;
each of the water supply chamber and the water vapor discharge chamber is formed between an inner ring to which ends of the evaporation pipes are inserted and an outer ring spaced from the inner ring; and
each of the oxygen-containing gas supply chamber and the oxygen-containing gas discharge chamber is formed between an inner ring to which ends of the heat exchange pipes (64) are inserted and an outer ring spaced from the inner ring.

5. The fuel cell module according to claim 4, wherein the reformed gas discharge chamber, the water vapor discharge chamber, and the oxygen-containing gas discharge chamber are provided on an upper end side close to the fuel cell stack; and
the mixed gas supply chamber, the water supply chamber, and the oxygen-containing gas supply chamber are provided on a lower end side opposite from the fuel cell stack.

6. The fuel cell module according to claim 5, wherein the fuel cell module includes a first partition plate provided vertically between the first area and the second area, a second partition plate provided vertically between the second area and the third area, and a third partition plate provided vertically between the third area and the forth area;
the condensed water collecting mechanism includes a first condensed water hole formed on a lower side of the first partition plate opposite to an upper side of the first partition plate which is closer to the fuel cell stack, a second condensed water hole formed on a lower side of the second partition plate and a third condensed water hole formed on a lower side of the third partition plate; and
a position of the second condensed water hole is higher than a position of the first condensed water hole, and a position of the third condensed water hole is higher than the position of the second condensed water hole.

7. The fuel cell module according to claim 6, wherein the number of the first condensed water holes is at least three, the number of the second condensed water holes is at least three, and the number of the third condensed water holes is at least three; and
the first condensed water holes, the second condensed water holes, and the third condensed water holes are arranged in an annular pattern, respectively.

8. The fuel cell module according to claim 6, wherein an opening of the first condensed water hole, an opening of the second condensed water hole, and an opening of the third condensed water hole have a size of 8 mm or more in diameter.

9. The fuel cell module according to claim 2, wherein at least one of the evaporation pipes forms an evaporation return pipe, which is connected to the water vapor discharge chamber and the mixed gas supply chamber.

10. The fuel cell module according to claim 1, wherein the fuel cell module is a solid oxide fuel cell module.

* * * * *